(12) United States Patent
Schatz et al.

(10) Patent No.: US 11,866,983 B2
(45) Date of Patent: Jan. 9, 2024

(54) RADAR SCANNING SYSTEM FOR STATIC OBSTACLE DETECTION FOR POWER DOOR MOVEMENT

(71) Applicant: Magna Electronics Inc., Auburn Hills, MI (US)

(72) Inventors: Kurt M. Schatz, Uxbridge (CA); Ming Wang, Newmarket (CA); Adam Bott, Newmarket (CA)

(73) Assignee: Magna Electronics Inc., Auburn Hills, MI (US)

( * ) Notice: Subject to any disclaimer, the term of this patent is extended or adjusted under 35 U.S.C. 154(b) by 392 days.

(21) Appl. No.: 17/249,296

(22) Filed: Feb. 26, 2021

(65) Prior Publication Data

US 2021/0262274 A1 Aug. 26, 2021

Related U.S. Application Data

(60) Provisional application No. 62/981,800, filed on Feb. 26, 2020.

(51) Int. Cl.
| | |
|---|---|
| *E05F 15/73* | (2015.01) |
| *G01S 13/931* | (2020.01) |
| *G01S 13/34* | (2006.01) |
| *G01S 13/42* | (2006.01) |

(52) U.S. Cl.
CPC .............. *E05F 15/73* (2015.01); *G01S 13/34* (2013.01); *G01S 13/426* (2013.01); *G01S 13/931* (2013.01); *E05Y 2900/531* (2013.01); *G01S 2013/93274* (2020.01)

(58) Field of Classification Search
CPC ........ E05F 15/73; G01S 13/34; G01S 13/426; G01S 13/931; G01S 2013/93274; E05Y 2900/531
USPC .......................................................... 342/70
See application file for complete search history.

(56) References Cited

U.S. PATENT DOCUMENTS

| | | | |
|---|---|---|---|
| 9,174,517 B2 | 11/2015 | Scheuring et al. | |
| 9,527,394 B1* | 12/2016 | Tang | B60W 10/26 |
| 9,711,050 B2* | 7/2017 | Ansari | G06Q 30/0251 |
| 9,878,656 B2* | 1/2018 | Gergets | F21V 23/04 |
| 10,246,009 B2 | 4/2019 | McMahon et al. | |
| 10,308,167 B2 | 6/2019 | Caron | |
| 10,422,166 B2* | 9/2019 | Papanikolaou | H02N 2/186 |
| 10,443,292 B2 | 10/2019 | Baruco et al. | |
| 10,816,993 B1* | 10/2020 | Tran | G06V 20/56 |

(Continued)

*Primary Examiner* — Nuzhat Pervin
(74) *Attorney, Agent, or Firm* — HONIGMAN LLP

(57) ABSTRACT

A vehicular door control system responsive to object detection includes a radar unit disposed at a vehicle that has a field of sensing adjacent to and exterior a door of the vehicle and that transmits radar signals and receives reflected radar signals representative of an object. A scanning actuator coupled to the radar unit moves the radar unit relative to the door to create a variation between the transmitted radar signals and the reflected radar signals. An electronic control unit (ECU) operates the radar unit to transmit the radar signals. While the radar unit is transmitting the radar signals and receiving the reflected radar signals, the ECU operates the scanning actuator to move the radar unit relative to the door. The ECU processes the received reflected radar signals to determine presence of the object and operates an electrically powered actuator coupled to the door to open and close the door.

29 Claims, 40 Drawing Sheets

(56) References Cited

U.S. PATENT DOCUMENTS

| | | |
|---|---|---|
| 10,914,110 B2 | 2/2021 | Mitchell |
| 10,928,830 B1* | 2/2021 | Tran .................. G06N 3/045 |
| 10,955,855 B1* | 3/2021 | Tran .................. B60R 11/04 |
| 10,992,755 B1* | 4/2021 | Tran .................. G01S 13/931 |
| 2009/0284405 A1 | 11/2009 | Salmon et al. |
| 2010/0253543 A1 | 10/2010 | Szczerba et al. |
| 2011/0196568 A1* | 8/2011 | Nickolaou ........ B60W 30/0953 |
| | | 367/87 |
| 2012/0234621 A1* | 9/2012 | Syvret .................. E05F 15/70 |
| | | 49/495.1 |
| 2015/0015434 A1* | 1/2015 | Okita .................. G01S 13/04 |
| | | 342/27 |
| 2017/0063050 A1* | 3/2017 | Fishovitz ............. E05F 15/70 |
| 2017/0292310 A1 | 10/2017 | Podkopayev |
| 2017/0306684 A1* | 10/2017 | Baruco ................ E05F 15/73 |
| 2017/0324162 A1 | 11/2017 | Khachaturian et al. |
| 2018/0170309 A1 | 6/2018 | McMahon et al. |
| 2018/0238099 A1* | 8/2018 | Schatz ............... E05F 15/622 |
| 2019/0101634 A1* | 4/2019 | Baheti .................. G01S 7/415 |
| 2019/0128040 A1 | 5/2019 | Mitchell |
| 2019/0153770 A1 | 5/2019 | Mitchell et al. |
| 2019/0154439 A1 | 5/2019 | Binder |
| 2019/0162010 A1 | 5/2019 | Rafrafi et al. |
| 2019/0162821 A1 | 5/2019 | Rafrafi et al. |
| 2019/0162822 A1 | 5/2019 | Rafrafi et al. |
| 2019/0162851 A1 | 5/2019 | Ullrich |
| 2019/0255917 A1* | 8/2019 | Nakano ................ B60J 1/17 |
| 2019/0309564 A1 | 10/2019 | Mitchell et al. |
| 2020/0018111 A1 | 1/2020 | Akbarian et al. |
| 2020/0072947 A1 | 3/2020 | Miu et al. |
| 2020/0088839 A1 | 3/2020 | Miu et al. |
| 2020/0157873 A1 | 5/2020 | Sabatini et al. |
| 2020/0249354 A1* | 8/2020 | Yeruhami ........... G01S 7/4817 |
| 2021/0003693 A1* | 1/2021 | Jales .................. G01S 7/40 |
| 2021/0149021 A1* | 5/2021 | Pinnock .............. G01S 7/4034 |
| 2021/0262274 A1* | 8/2021 | Schatz ................ G01S 13/931 |
| 2022/0342066 A1* | 10/2022 | Burger ................ G01S 13/58 |
| 2022/0365207 A1 | 11/2022 | Corner et al. |

* cited by examiner

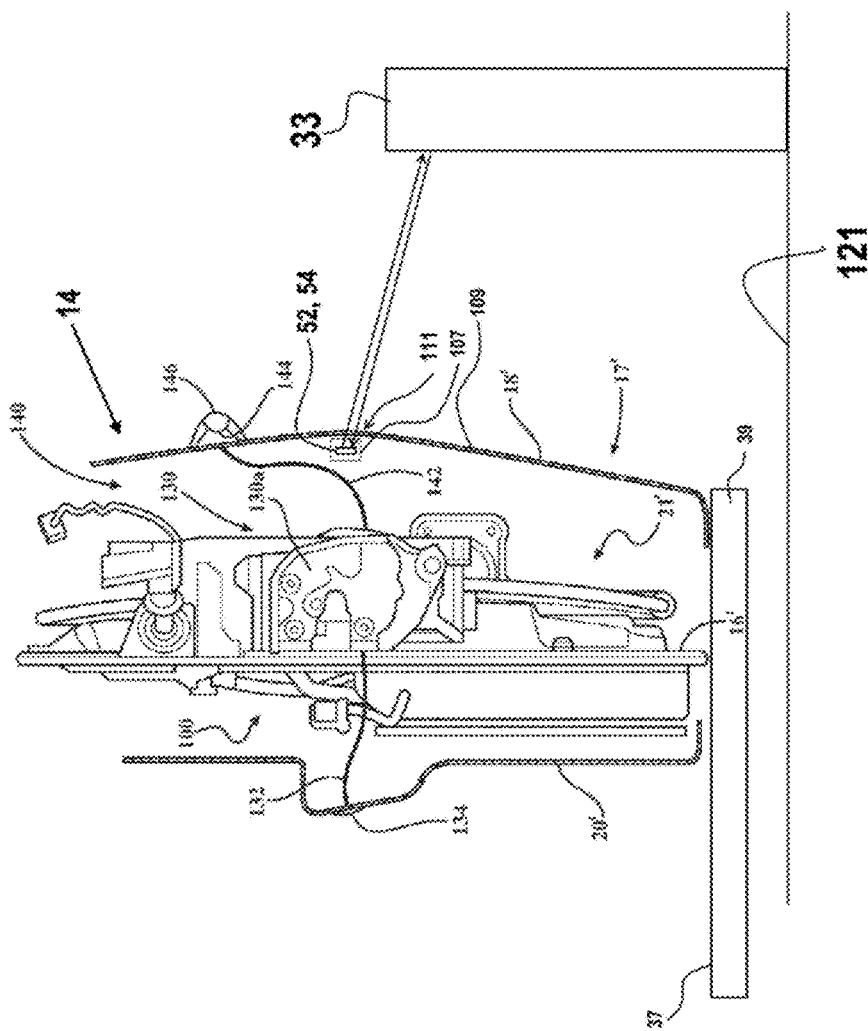

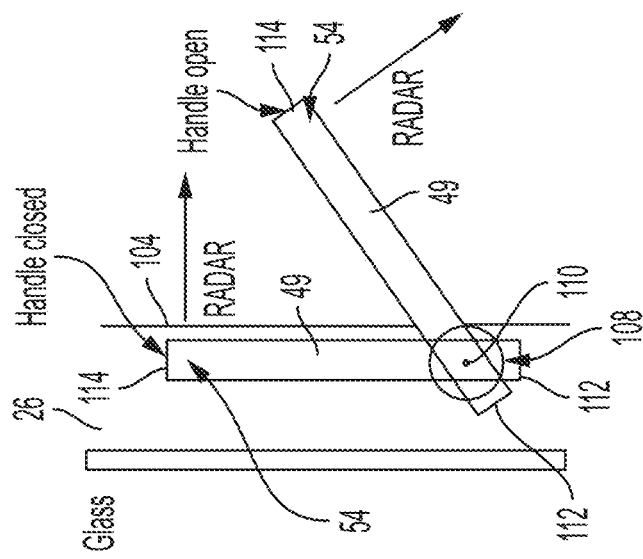

Processing Chain - CFAR

CFAR stands for Constant False Alarm Rate, a adaptive algorithm used to separate signals from noise.

Illustrated on the right, the points at which the magnitude of the range profile cross the calculated CFAR threshold represent range detections.

Different CFAR methods calculate Z differently. For example, in CFAR -OS (CFAR Ordered Statistics), Z is calculated as the kth ordered element of the two neighborhoods.

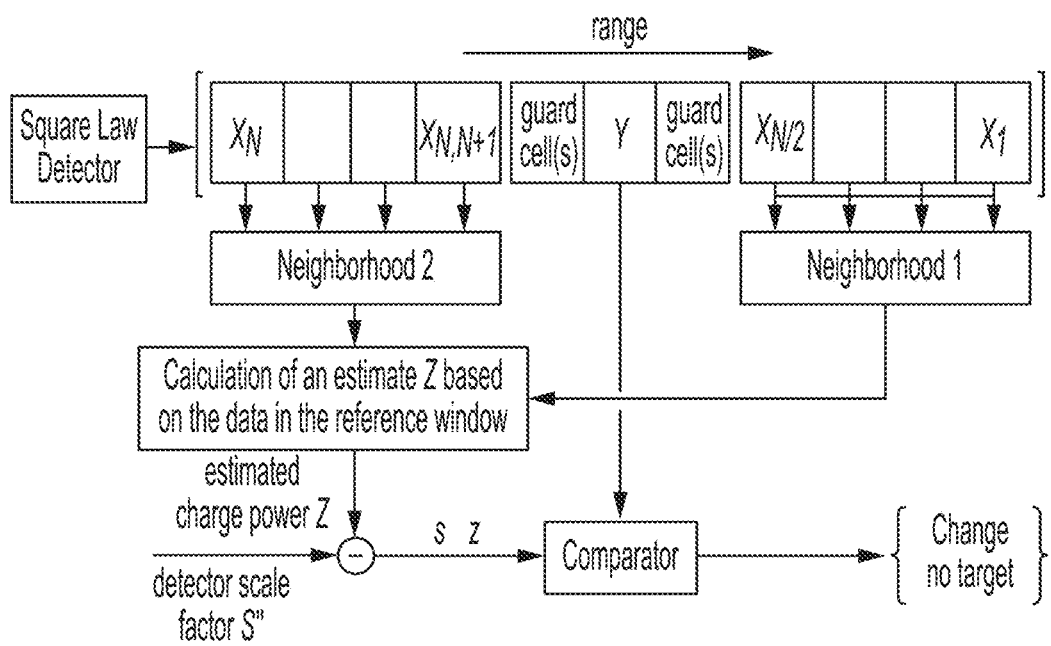

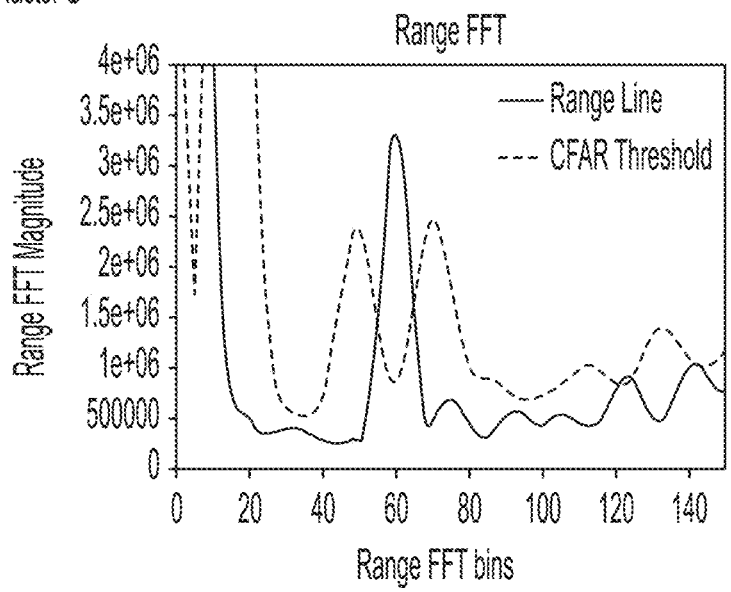

FIG. 25

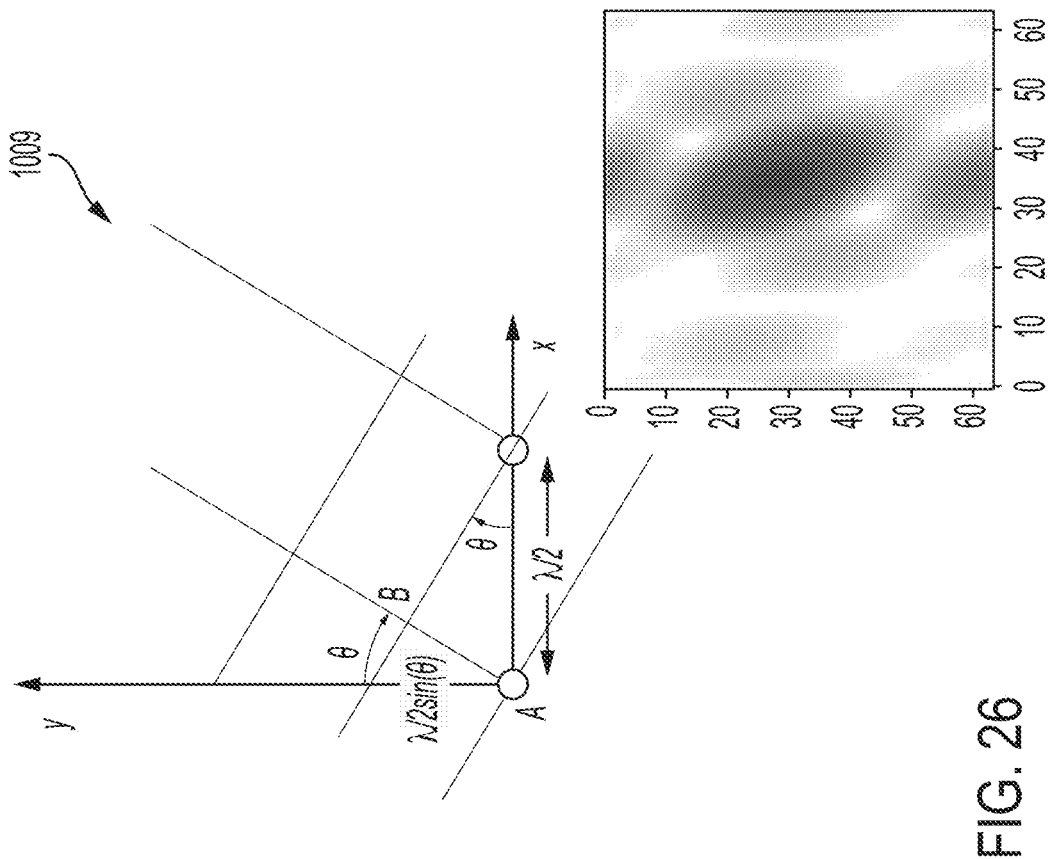

Processing Chain - Direction of Arrival

Estimating the angle of arrival of an object requires at least two Rx antennas. The signal from the *Tx* antenna is reflected from an object (at an angle θ with regard to the radar) and is received at both Rx antennas.

The signal from the object must travel an additional distance of $d \sin θ$ to reach the second $RX_2$ antenna.

This corresponds to a phase difference of $\omega = \frac{2\pi}{\lambda} d \sin θ$ between the signals received at the two Rx antennas.

By performing an FFT across an array generated from the antenna placement, peaks in the resultant FFT correspond to signals from those directions.

In addition, if multiple peaks are detected, multiple objects can be detected (per range gate)

FIG. 26

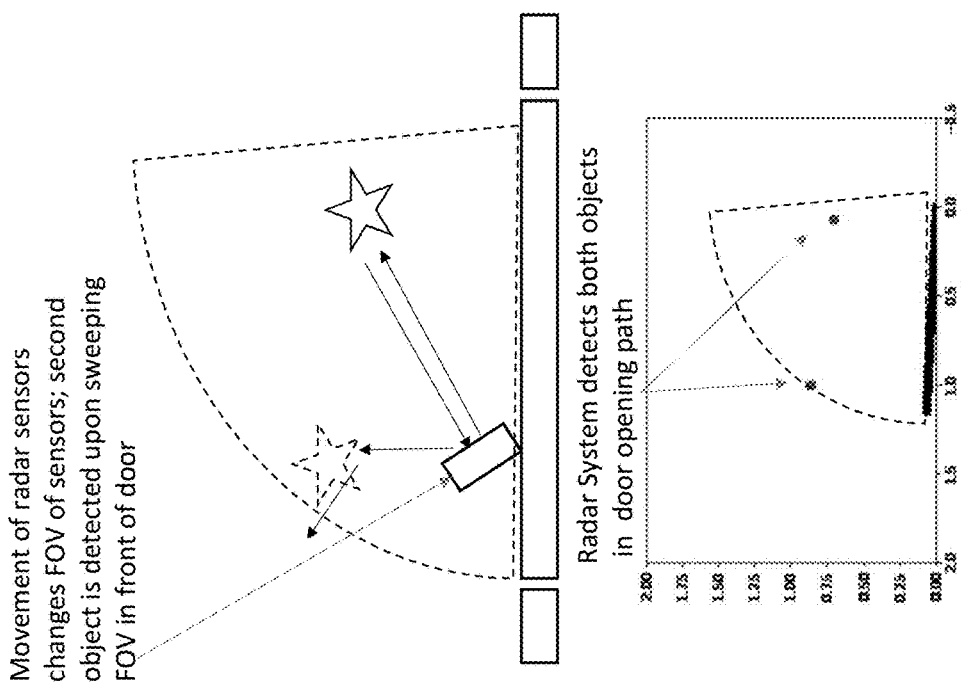
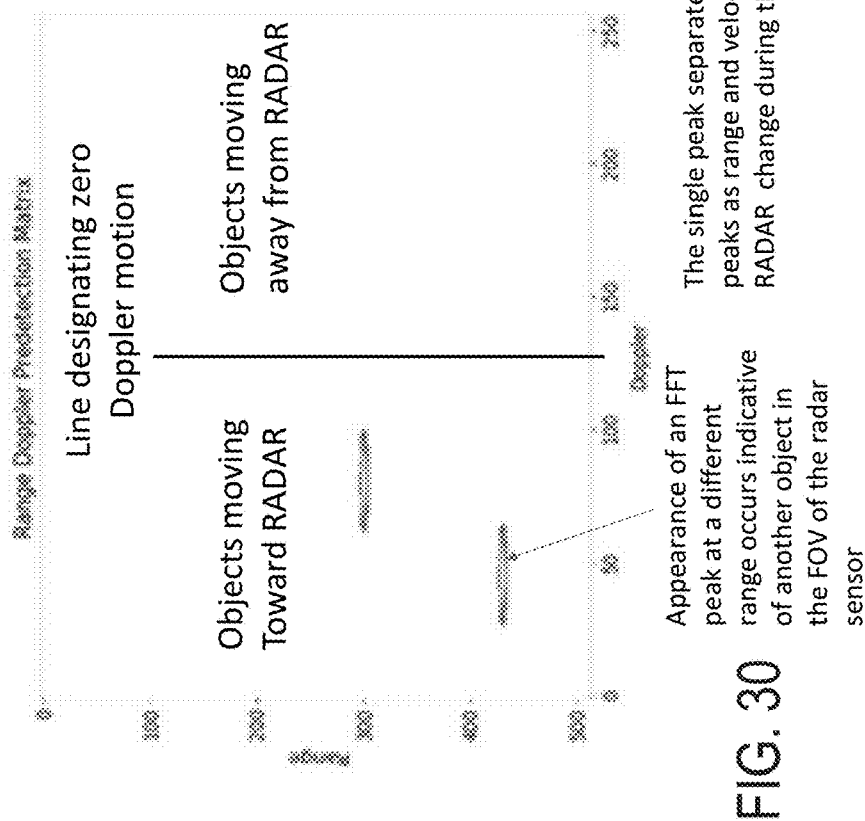
Increasing Detectability/Reflectivity Detection of Objects within Radar Sensor FOV Door closed, radar sensor in motion
FIG. 30

Increasing Differentiation of multiple objects within the Radar Sensor FOV
Door closed, radar sensor not in motion

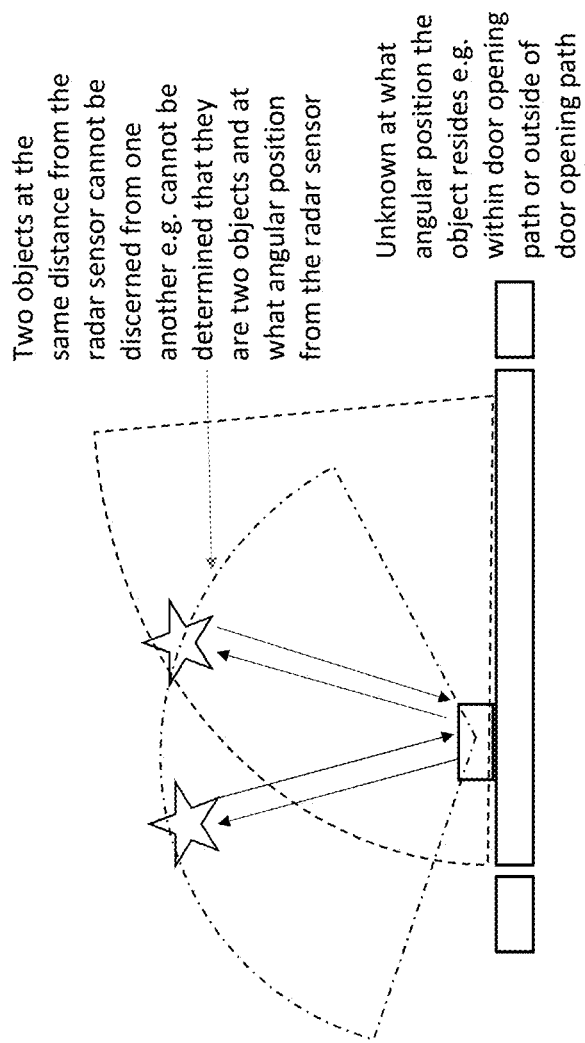

Two objects at the same distance from the radar sensor cannot be discerned from one another e.g. cannot be determined that they are two objects and at what angular position from the radar sensor Unknown at what angular position the object resides e.g. within door opening path or outside of door opening path

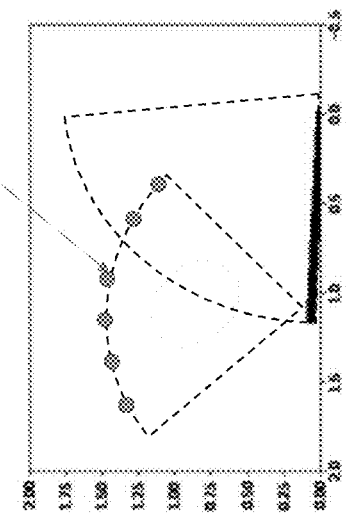

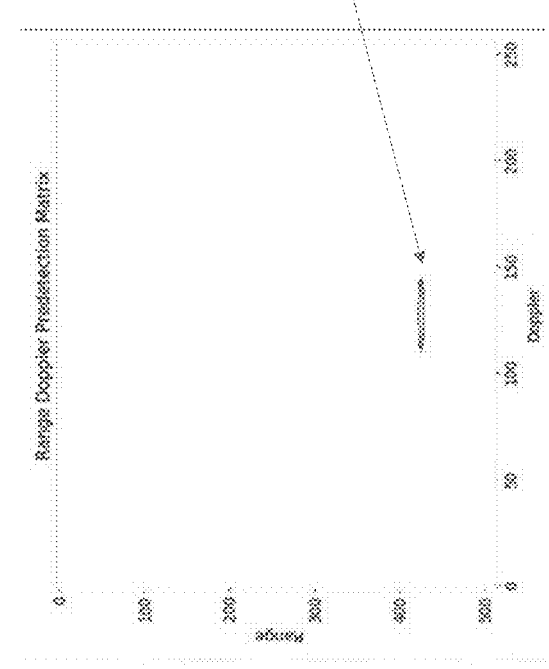

The two objects appear as a single FFT signal

FIG. 31

From FIG. 33

Peak grouping is used to merge closely located peaks so that angle of arrival calculation is more efficient (fewer peaks so fewer calculations), reduces noise level for a single detection DOPPLER DISAMBIGUATION - Differentiate objects during movement:
Distance to the objects is calculated:
Range and Doppler data is populated into a matrix, then sum the matrix
Run Doppler and Range CFAR algorithms to determine object locations in 2D space
Run angle of arrival calculations at the ranges where the CFAR algorithms have determined an object to be located (4D)
This results in range, azimuth, elevation and speed being determined.
More than one object can be detected as long as they are in separate range bins OR same range bin in different Doppler bins.
Advantage for moving — as they move away, two objects that appear in the same range bin may appear as separate detections in the same range based on Doppler differences, so moving system will result in ranges to objects shifting relative to RADAR origin, and relative velocity differences to RADAR To FIG. 33 CONT. B

FIG. 33 CONT. A

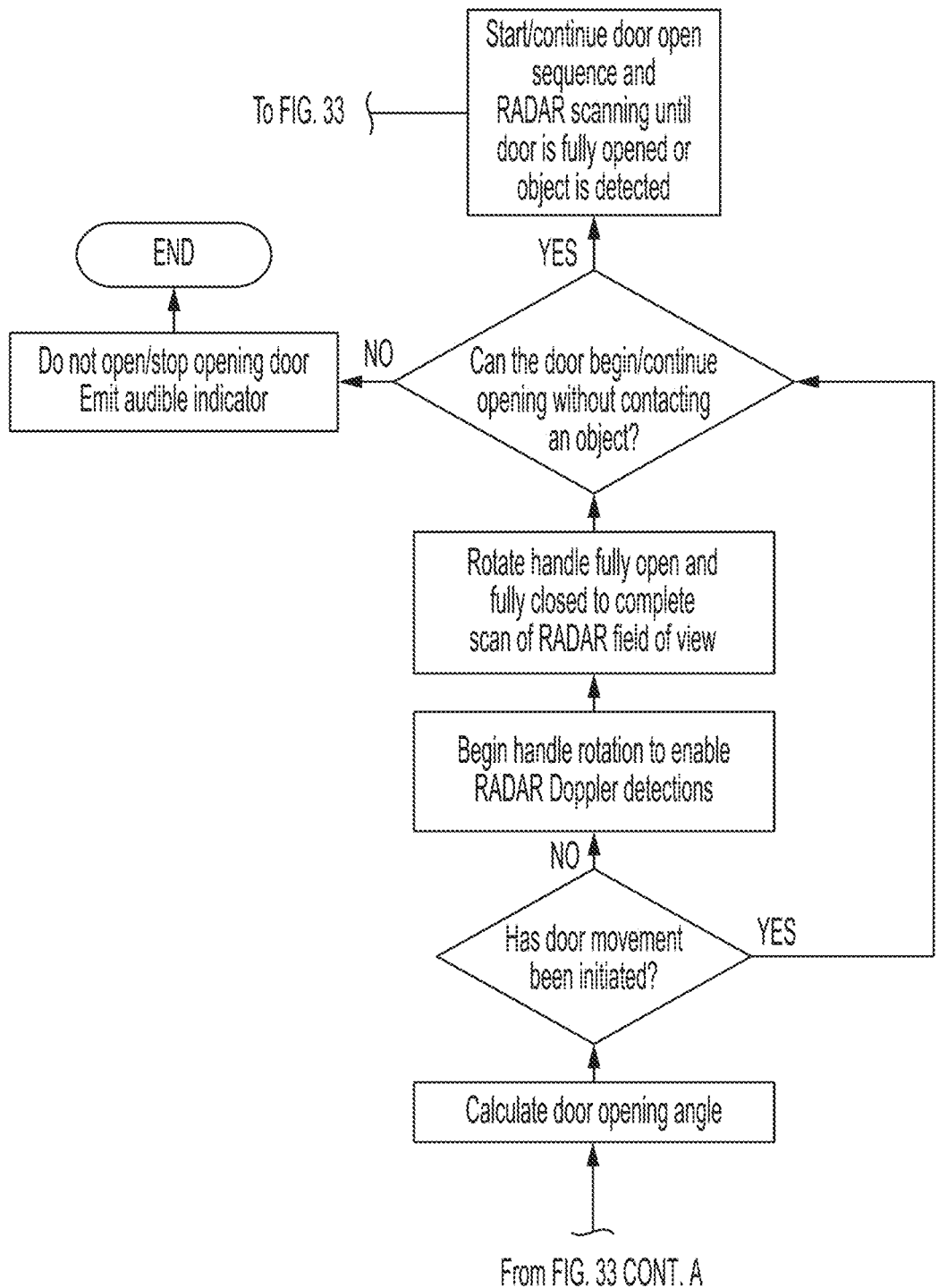
FIG. 33 CONT. B

RADAR SCANNING SYSTEM FOR STATIC OBSTACLE DETECTION FOR POWER DOOR MOVEMENT

FIELD OF THE INVENTION

The present invention relates generally to a non-contact obstacle detection system for a motor vehicle and methods of operating the non-contact obstacle detection system for power door movement.

BACKGROUND OF THE INVENTION

Closure members for vehicles (e.g., doors, lift gates, etc.) are increasingly provided with powered actuation mechanisms capable of opening and/or closing the closure members. Typically, powered actuation systems include a power-operated device such as, for example, an electric motor and a rotary-to-linear conversion device that are operable for converting the rotary output of the electric motor into translational movement of an extensible member. In most arrangements, the electric motor and the conversion device are mounted to the closure member and the distal end of the extensible member is fixedly secured to the vehicle body. One example of such a powered actuation system includes a power swing door actuator having a rotary-to-linear conversion device configured to include an externally-threaded leadscrew rotatively driven by the electric motor and an internally-threaded drive nut meshingly engaged with the leadscrew and to which the extensible member is attached. Accordingly, control over the speed and direction of rotation of the leadscrew results in control over the speed and direction of translational movement of the drive nut and the extensible member for controlling swinging movement of the passenger door between its open and closed positions. Such power actuated operation can lead to issues with the closure members unintentionally striking surrounding objects or obstacles. For example, an object near the closure member may obstruct the opening or closing of the closure member and/or the closure member may be damaged if opened under power and strikes the obstacle.

Sensing systems utilizing radar have also been used to detect the presence and position of objects near the motor vehicle prior to or while moving the closure members of the vehicle using the powered actuation systems. Such sensing systems may, for example, utilize Doppler radar. However, while Doppler radar is capable of detecting objects moving with a relative velocity, sensing systems for powered movement of closure members typically involve detecting static objects. Consequently, a static scan (i.e., with the radar sensor and the closure member not moving) cannot provide sufficient relative velocity. A relative velocity can be developed as a radar sensor mounted to the closure member moves along with a moving closure member (i.e., solely due to the movement of the closure member itself). Nevertheless, such movement of the closure member may be undesirable and it would be advantageous to detect any static objects without first moving the closure member.

Thus, there is an increasing need for improved obstacle detection systems that control movement of the closure member in response to detecting the object. Furthermore, other desirable features and characteristics of the present invention will become apparent from the subsequent detailed description and the appended claims, taken in conjunction with the accompanying drawings and the foregoing technical field and background.

SUMMARY OF THE INVENTION

It is an aspect of the present disclosure to provide a vehicular door opening control system that opens (and optionally closes) a vehicle door. The vehicular door opening control system includes a radar unit at a vehicle equipped with the vehicular door opening control system. The radar unit has a field of sensing adjacent to and exterior of the door of the vehicle, and transmits emitted radar signals and receives reflected radar signals reflected from an object present in the field of. A scanning actuator is coupled to the radar unit and operable to move the radar unit relative to the door to create a variation between the transmitted radar signals and the reflected radar signals indicative of a shift between the radar unit and the object. An electrically powered actuator is coupled to the door and operable to, when electrically powered, move the door relative to the vehicle to open and close the door. An electronic control unit (ECU) is in communication with the radar unit, the scanning actuator and the electrically powered actuator and is operable to operate the radar unit to transmit the emitted radar signals and receive the reflected radar signals. While the radar unit is transmitting the emitted radar signals and receiving the reflected radar signals, the ECU operates the scanning actuator to move the radar unit relative to the door. The ECU processes the received reflected radar signals to determine presence of the object in the space adjacent to and exterior of the door. Responsive to determining presence of the object in the space adjacent to and exterior of the door, the ECU operates the electrically powered actuator to control movement of the door relative to the vehicle.

It is another aspect of the disclosure to provide a method of controlling opening of a vehicular door. The method includes providing a radar unit at or near a door of a vehicle and having a field of sensing that includes a space adjacent to and exterior of the door. The method continues with providing a scanning actuator coupled to the vehicle and the radar unit and operable to operably move the radar unit relative to the door. The method further includes providing an electrically powered actuator at the vehicle. The electrically powered actuator is operable, when electrically powered, to move the door along a door path. Additionally, the method includes transmitting emitted radar signals from the radar unit in the space adjacent to and exterior of the door and receiving at the radar unit reflected radar signals reflected from the object. The method continues with, while transmitting emitted radar signals and receiving reflected radar signals, operating the scanning actuator to move the radar unit relative to the door to create a variation between the emitted radar signals and the reflected radar signals indicative of a relative shift between the radar unit and the object. The method further includes, responsive to receiving reflected radar signals, processing the reflected radar signals at an electronic control unit (ECU) to determine presence of the object in the space adjacent to and exterior of the door. Additionally, the method includes, responsive to determining via the ECU presence of the object in the space adjacent to and exterior of the door, determining whether the object is in the door path. When the object is not in the door path, the method includes, operating the electrically powered actuator to move the door along the door path. The method includes, when the object is in the door path, preventing movement of the door.

These and other aspects and areas of applicability will become apparent from the description provided herein. The description and specific examples in this summary are intended for purpose of illustration only and are not intended to limit the scope of the present disclosure.

BRIEF DESCRIPTION OF THE DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which:

FIG. 2A is a side perspective view of the front passenger door of FIG. 1 shown in isolation, illustrating various illustrative positioning of the radar sensors of the non-contact obstacle detection system according to aspects of the disclosure;

FIG. 2B is a lateral cross-sectional view of the front passenger door of FIG. 2A, illustrating one of the various illustrative positioning of the radar sensors disposed behind a radar transparent portion of the outer panel of the vehicle door, in accordance with an illustrative example;

FIG. 8 is a diagram of the at least one radar unit disposed in a handle of a closure member of the motor vehicle along with a scanning actuator configured to rotate both the at least one radar unit and the handle about a vertical rotation axis according to aspects of the disclosure;

FIG. 9 is a table showing an activation time, speed of a motor of the scanning actuator, and an angle that the handle is moved by the scanning actuator according to aspects of the disclosure;

FIGS. 22 to 26 are diagrams and explanations of processing steps of the method of FIG. 21, in accordance with illustrative examples;

FIGS. 29 to 32 are diagrams of illustrative examples of operation of the non-contact obstacle detection system illustrating obstacle positioning correlated to mapped processed radar data points in accordance with aspects of the present disclosure.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to an obstacle detection system of the type well-suited for use in many applications. More specifically, a non-contact obstacle detection (NCOD) system for a motor vehicle and methods of operating the non-contact obstacle detection system are disclosed herein. The non-contact obstacle detection system of this disclosure will be described in conjunction with one or more example embodiments. However, the specific example embodiments disclosed are merely provided to describe the inventive concepts, features, advantages and objectives with sufficient clarity to permit those skilled in the relevant art to understand and practice the disclosure.

Figure 1:
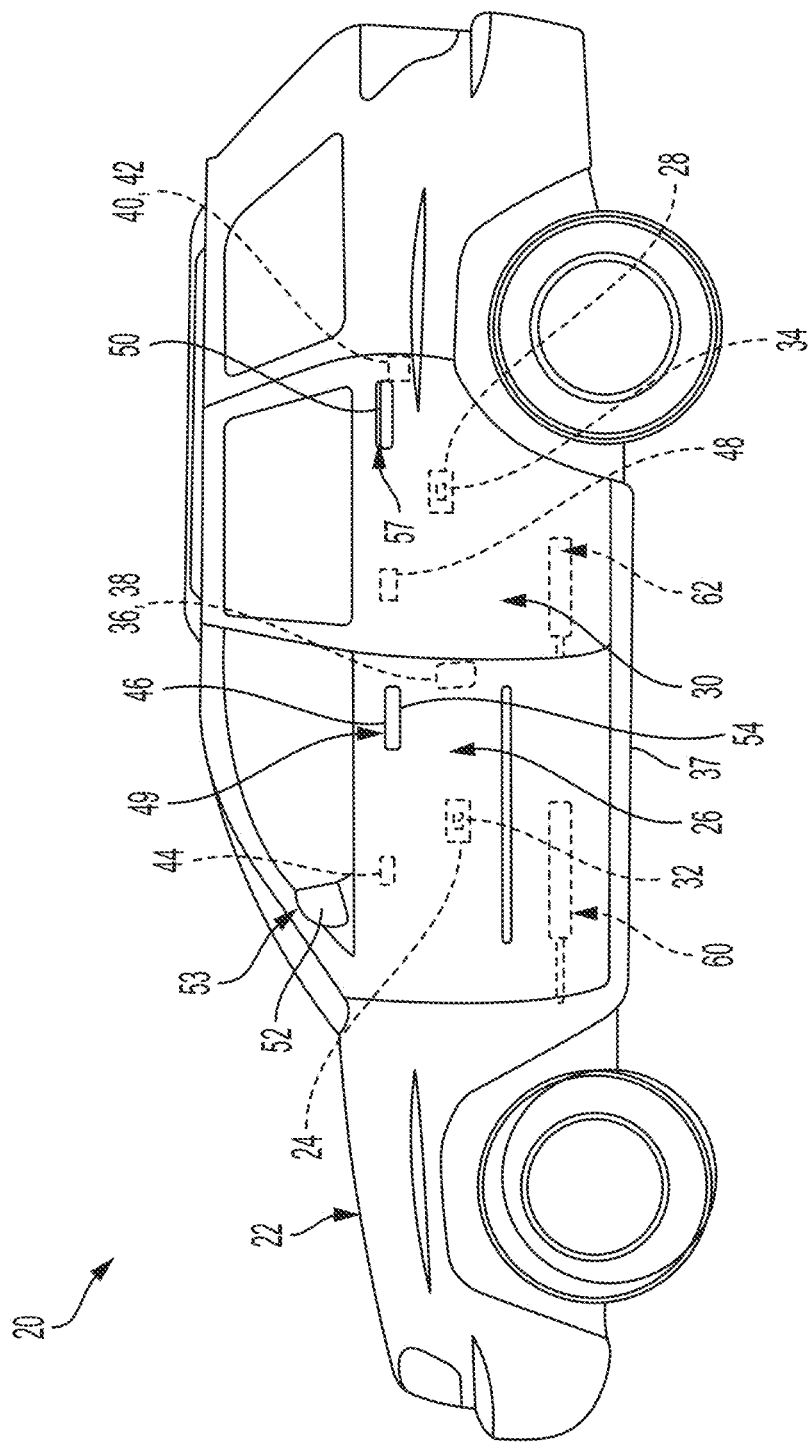
FIG. 1 is a perspective view of a motor vehicle equipped with a non-contact obstacle detection system capable of power door actuation according to aspects of the disclosure.

Referring to the Figures, wherein like numerals indicate corresponding parts throughout the several views, the non-contact obstacle detection system 20 for the motor vehicle 22 is shown. As best shown in FIG. 1, the detection system 20 includes a front door node 24 for a first closure member (e.g., front passenger door 26) and a rear door node 28 for a second closure member (e.g., rear passenger door 30).

The front door node 24 includes a first electronic control unit 32 that has a plurality of input-output terminals adapted to connect to a power source (e.g., a battery of the motor vehicle 22) and to a vehicle bus (e.g., CAN or controller area network). The rear door node 28 includes a second electronic control unit 34 also adapted to connect to the power source and to the vehicle bus (e.g., CAN or controller area network). The first electronic control unit 32 and second electronic control unit 34 are each in communication with one another.

A first latch assembly 36 is in communication with the first electronic control unit 32 for latching the first closure member 26 relative to the motor vehicle 22 (e.g., to a vehicle body 37 of the motor vehicle 22). The system 20 also includes a first cinching actuator 38 coupled to the first latch assembly 36 for cinching the first closure member 26 to the vehicle body 37 of the motor vehicle 22. The system 20 also includes a second latch assembly 40 in communication with the second electronic control unit 34 for latching the second closure member 30 relative to the motor vehicle 22 and a second cinching actuator 42 is coupled to the second latch assembly 40 for cinching the second closure member 30 to the motor vehicle 22. For each latch assembly 36, 40, the cinch actuators 38, 42 may be included with or separate from the latch assemblies 36, 40.

The at least one first and second latch assemblies 36, 40 can each provide a power release, double lock, lock for closure members 26, 30. The at least one first and second latch assemblies 36, 40 can also each include switches to indicate door open, door ajar, lock status, inside release (double and single pull). Specifically, at least one first handle switch (e.g., first inside and outside switches 44, 46 on the front passenger door 26) is coupled to the first electronic control unit 32 for detecting operation of a first handle 49 of the first closure member 26. At least one second handle switch (e.g., second inside and outside switches 48, 50 on the rear passenger door 30) is also coupled to the second electronic control unit 34 for detecting operation of a second handle 57 of the second closure member 30. Inside and outside switches 44, 46, 48, 50 on the front passenger door 26 and the rear passenger door 30 may be used to indicate that a user 51 is attempting to move the door 26, 30.

At least one radar unit 52, 54 is coupled to the first electronic control unit 32 for detecting an obstacle 33 (FIG. 6) adjacent the motor vehicle 22. For example, the at least one radar unit 52, 54 could include a handle radar unit 54 disposed within or attached to a handle 49, 57 of the door 26, 30 and/or an outside mirror radar unit 52 mounted to or within an outside mirror 53, both non-limiting of examples of vehicle accessories 99 supporting the at least one radar unit 52, 54. In one possible configuration, such vehicle accessories may be configured as projecting structures extending away from and spaced apart from the vehicle body 14, such as extending from an outer panel of the vehicle or door of the vehicle, for providing an augmented field of view of the space adjacent the motor vehicle 22. Such vehicle accessories, or a radar sensor supporting structures, may be moveable relative to the vehicle body 14, such as movable towards a spaced position away and/or towards the vehicle body 14, or movable from an already spaced positioning of the radar sensor supporting structure towards and/or away this spaced positioning such that the at least one radar unit 52, 54 is moved along with the movement of the vehicle accessory itself, for example under control of a power actuator or spring loaded mechanism without limitation, such as a deployable handle or a foldable side rear view mirror configuration. In another configuration, the vehicle accessory 99 may be fixed for no movement relative to the vehicle body 14, but rather the at least one radar unit 52, 54 is housed within the vehicle accessory and is configured to move within the vehicle accessory 99 (e.g., the at least one radar unit 52, 54 moves relative to the vehicle accessory 99). In another configuration, the at least one radar unit 52, 54 is housed within another component of the vehicle (e.g., a vehicle door latch, a door module, a door cavity, a cavity defined by the vehicle body 14, etc.) and is configured to move such a space relative to the vehicle body 14. Other types of vehicle accessories are possible, such as an applique 101, a vehicle trim or trim panel 103, a light assembly such as a side light module 105, or a separate obstacle detection module unit 107 housing the at least one radar unit 52, 54 which may be mounted on the door 14, or the vehicle body 14 (e.g., rocker panels 39, front or rear bumpers), or provided next to a port formed in the outer panel 109 of vehicle door 14, or provided within the vehicle door 14 cavity when the vehicle door panel 109 is formed in whole or in part from an electromagnetic transparent material (e.g., plastic for providing an electromagnetic transparent portion 111 to the vehicle door 14 such as outer panel 109). Other locations for the at least one radar unit 52, 54 on the motor vehicle 22 are contemplated such as behind a vehicle glass.

A first power actuator 60 is coupled to the first closure member 26 and to the first electronic control unit 32 for moving the first closure member 26 relative to the vehicle body 37. Similarly, a second power actuator 62 is coupled to the second closure member 30 and to the second electronic control unit 34 for moving the second closure member 30 relative to the vehicle body 37. Each of the first and second power actuators 60, 62 is configured to include an electric motor, a reduction gear train, a slip clutch, and a drive mechanism, which together define a power assembly or first power actuator 60; however, it should be appreciated that various other power actuators 60, 62 may be used instead.

Figure 2:
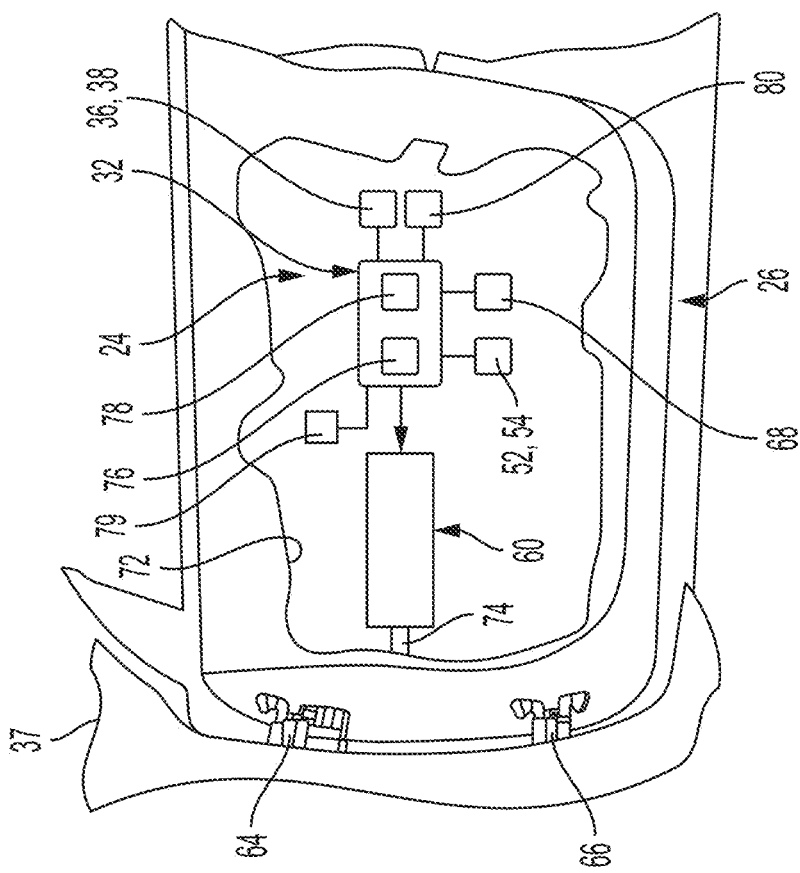
FIG. 2 is a diagrammatic view of the front passenger door shown in FIG. 1, with various components removed for clarity purposes only, in relation to a portion of the vehicle body and which is equipped with the non-contact obstacle detection system according to aspects of the disclosure.
Figure 2C:
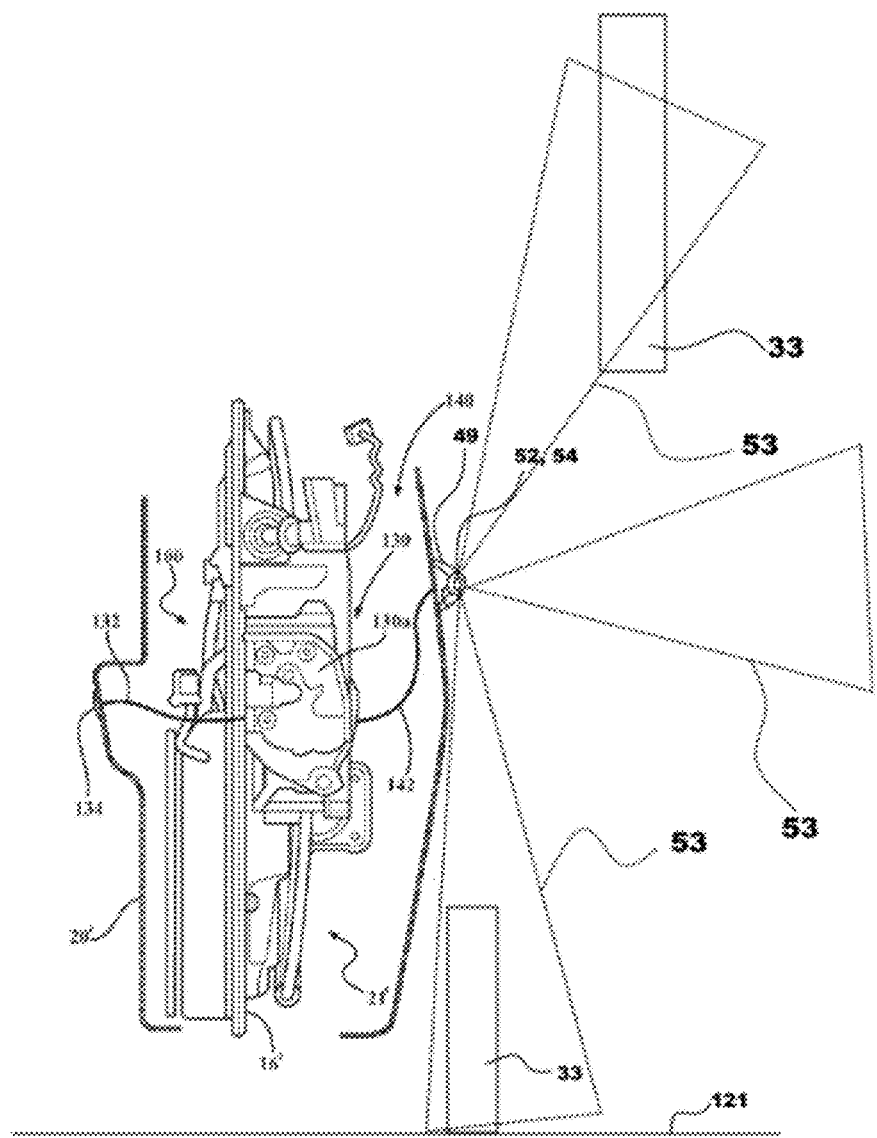
FIG. 2C is a lateral cross-sectional view of the front passenger door of FIG. 2A, illustrating one of the various illustrative positioning of the radar sensors disposed behind a radar transparent portion of a handle assembly of the vehicle door, in accordance with an illustrative example.
Figure 2D:
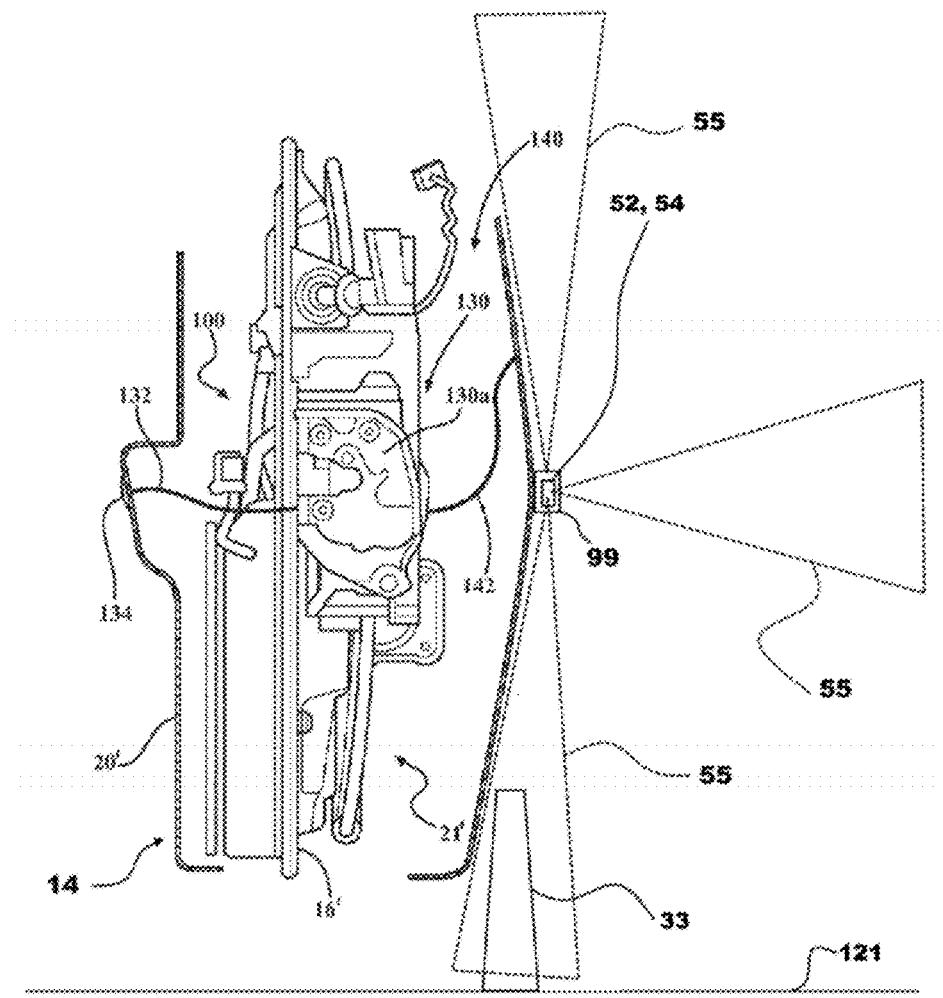
FIG. 2D is a lateral cross-sectional view of the front passenger door of FIG. 2A, illustrating one of the various illustrative positioning of the radar sensors disposed at an apex of the outer door panel for reducing blind spots of the radar sensors due to a curvature of the outer panel of the door, in accordance with an illustrative example.
Figure 3A:
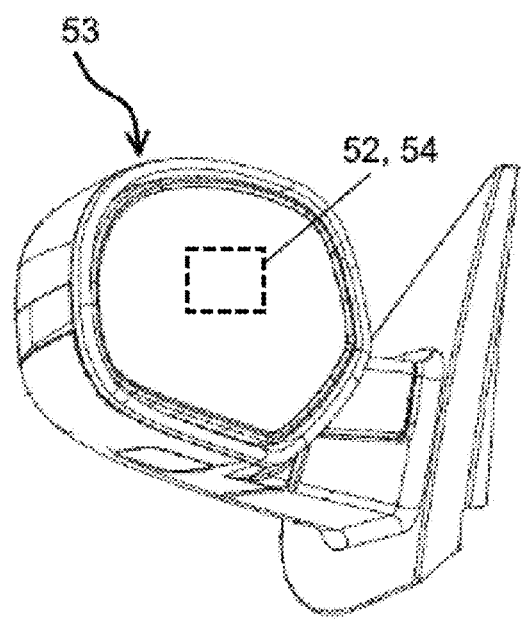
Figure 3D:
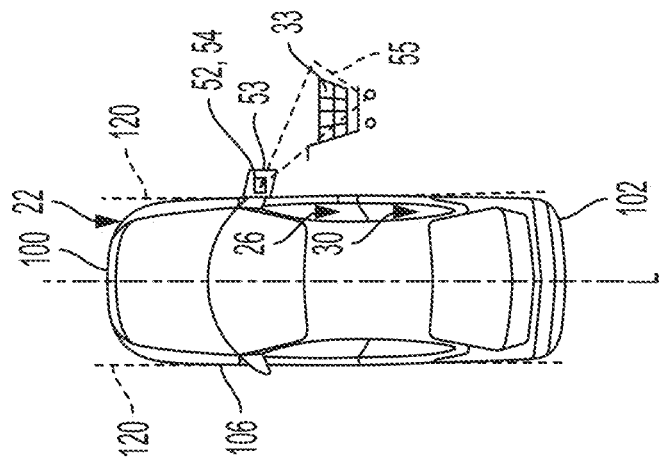
FIGS. 3B to 3D are overhead views of a vehicle equipped with at least one radar unit that illustrate a sweeping sequence of a radar field of view adjacent the front passenger door of the motor vehicle in response to motion of the mirror of FIG. 3A, according to aspects of the disclosure.
Figure 3C:
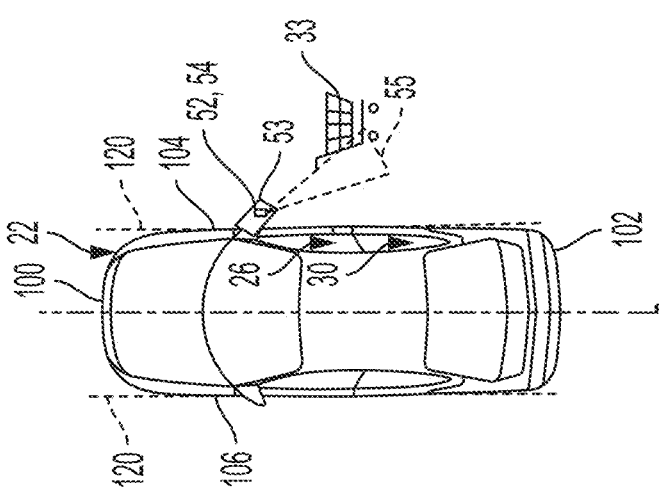
Figure 3B:
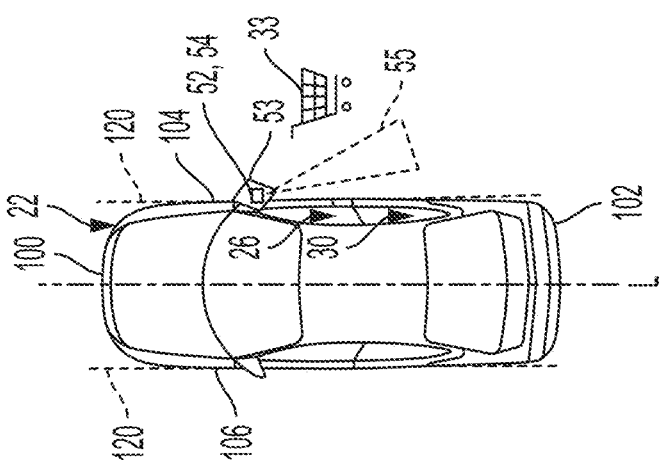

Referring to FIG. 2, the front passenger or vehicle door 26 is shown with the front door node 24 and is attached to the vehicle body 37 by an upper hinge 64 and a lower hinge 66. It should be appreciated that although only the first closure member 26 is shown, the second closure member 30 has a similar arrangement. At least one first Hall-effect sensor 68 is coupled to the first electronic control unit 32 for monitoring a position and speed of the first closure member 26 during movement.

Thus, one or more first Hall-effect sensors 68 may be provided and positioned to send signals to the first electronic control unit 32 that are indicative of rotational movement of the electric motor (e.g., of the first and second power actuators 60, 62) and indicative of the rotational speed of the electric motor, for example, based on counting signals from the at least one Hall-effect sensor 68 detecting a target on a motor output shaft. In situations where the sensed motor speed is greater than a threshold speed and where a current sensor (not shown) registers a significant change in the current draw, the first electronic control unit 32 may determine that the user 51 is manually moving door 26 while the electric motor is also operating, thus moving vehicle door 26 between its open and closed positions. The first electronic control unit 32 may then send a signal to the electric motor to stop and may even disengage the slip clutch (if provided). Conversely, when the first electronic control unit 32 is in a power open or power close mode and the first Hall-effect sensors 68 indicate that a speed of the electric motor is less than a threshold speed (e.g., zero) and a current spike is registered, the first electronic control unit 32 may determine that the obstacle 33 is in the way of vehicle door 26, in which case the system 20 may take any suitable action, such as sending a signal to turn off the electric motor. As such, the first electronic control unit 32 receives feedback from the first Hall-effect sensors 68 to ensure that contact of obstacle 33 has not occurred during movement of vehicle door 26 from the closed position to the open position, or vice versa. Similarly, although not shown in FIG. 2, at least one second Hall-effect sensor 70 is coupled to the second electronic control unit 34 for monitoring a position and speed of the second closure member 30 during movement.

The first power actuator 60 for the first closure member 26 is shown mounted within an interior chamber 72 of door 26. Power swing door actuator 60 further includes a connector mechanism or extensible member 74 of the drive mechanism to connect to the vehicle body 37. Thus, the first electronic control unit 32 is in communication with the first power actuator 60 (e.g., the electric motor) for providing electric control signals thereto. The first and second electronic control units 32, 34 each can include a microprocessor 76 and a memory 78 having executable computer readable instructions stored thereon.

As is also schematically shown in FIG. 2, the first electronic control unit 32 can be in communication with the at least one radar unit 52, 54. The first electronic control unit 32 may also communicate with the first internal/external handle switch 44, 46 for receiving a request or power opening (or closing) signal from a user 51 to open (or close) vehicle door 26. As shown, the first electronic control unit 32 can be packaged behind class-A surfaces (out of sight), for example, within door cavity 72 of door 26. The first electronic control unit 32 may also be coupled with an audible indication unit 79 for emitting an audible indicator. However, it should be understood that the first electronic control unit 32 could instead be located in other areas such as, but not limited to within the outside mirror 53, door trim, rocker panel area, or may be provided within the first latch assembly 36.

The first electronic control unit 32 of the front door node 24 includes software and hardware required to process radar signals from the at least one radar unit 52, 54 for obstacle detection. Examples of radar sensors and associated assemblies and radar signal processing techniques for gesture recognition and obstacle detection are illustrated in commonly owned U.S. Publication Nos. US-2019-0162851 and/or US-2018-0238099, which are hereby incorporated herein by reference in their entireties. The sensing system and radar units and control systems may utilize aspects of the systems described in U.S. Pat. Nos. 10,914,110; 10,443,292 and/or 10,246,009, and/or U.S. Publication Nos. US-2020-0157873; US-2020-0088839; US-2020-0018111; US-2019-0309564; US-2019-0162822; US-2019-0162821; US-2019-0162010; US-2019-0153770; US-2019-0128040; US-2018-0238099; US-2018-0170309 and/or US-2017-0306684, and/or International Publication No. WO 2021/000045, which are all hereby incorporated herein by reference in their entireties.

The second electronic control unit 34 of the rear door node 28 requests (e.g., "pulls") sensor information from first electronic control unit 32 of the front door node 24 for obstacle detection during control of movement of the rear door 30. For example, a request for sensor information may be embodied as an encapsulated payload in a communication network type packet which may be transmitted to the first electronic control unit 32 by the second electronic control unit 34 over the vehicle bus, such as LIN, CAN, Ethernet, etc.

Alternatively, the second electronic control unit 34 of the rear door node 28 may be provided with obstacle sensing processing and hardware instead of communicating with the first electronic control unit 32 (e.g., the rear door node 28 may include separate radar units besides the at least one radar unit 52, 54 used by the first electronic control unit 32). The first and second electronic control units 32, 34 can utilize separate motor controls, or may control the power actuators 60, 62 directly. As the first and second electronic control units 32, 34 are in communication with the first and second latch assemblies 36, 40, the status of release latch switches (not shown) within the first and second latch assemblies 36, 40 can also be communicated to the first and second electronic control units 32, 34 so that a state of the first and second latch assemblies 36, 40 can be known to the first and second electronic control units 32, 34.

Figure 3:
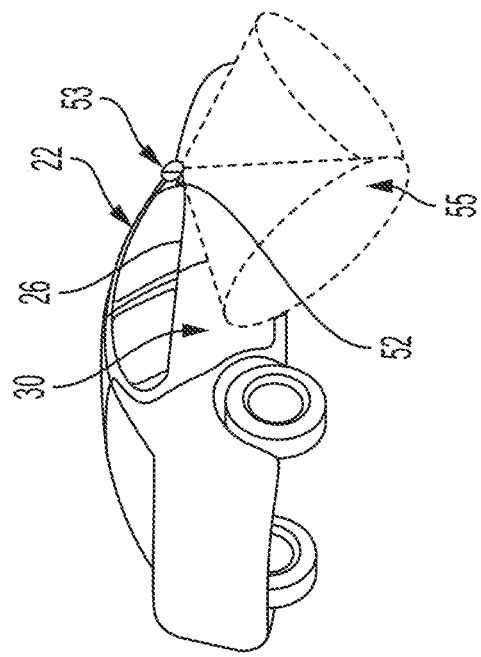
FIGS. 3 and 3A are perspective views of the at least one radar unit of the non-contact obstacle and detection system of FIGS. 1 and 2 on a mirror of the motor vehicle according to aspects of the disclosure.
Figure 4:
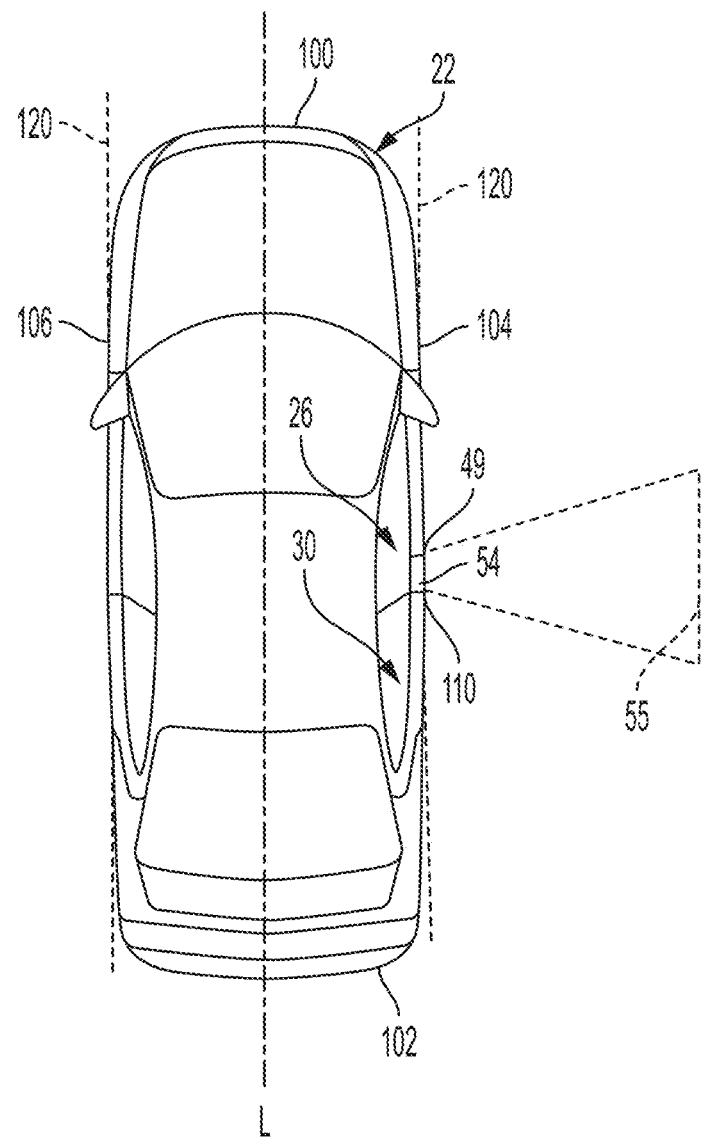
FIG. 4 is an overhead view of a vehicle equipped with at least one radar unit of the non-contact obstacle and detection system of FIGS. 1 and 2 on the front passenger door of the motor vehicle according to aspects of the disclosure.
Figure 4C:
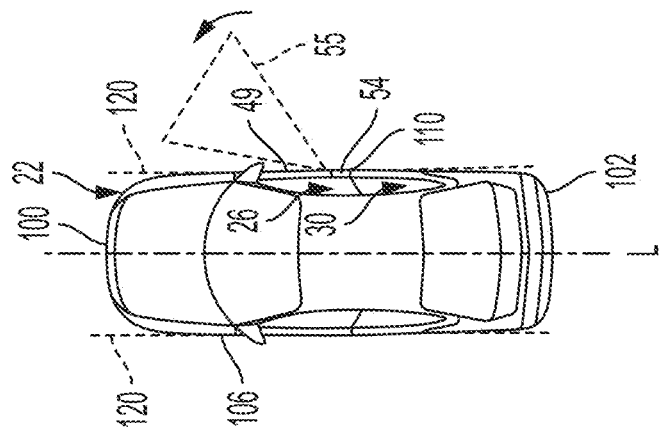
FIG. 4A-4C are overhead views of a vehicle equipped with at least one radar unit that illustrate a sweeping sequence of a radar field of view adjacent the front passenger door of the motor vehicle due to a moving radar sensor according to aspects of the disclosure.
Figure 4B:
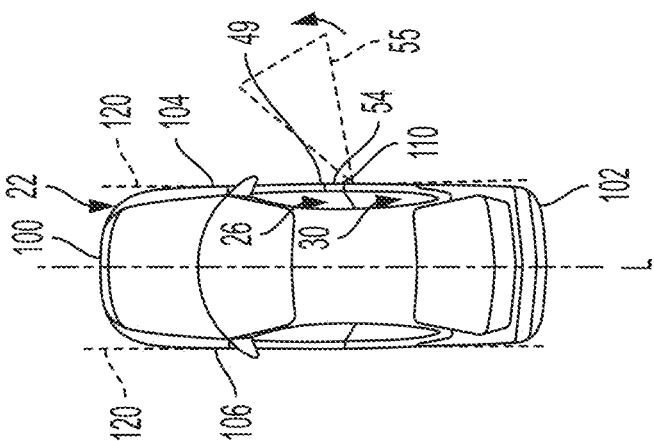
Figure 4A:
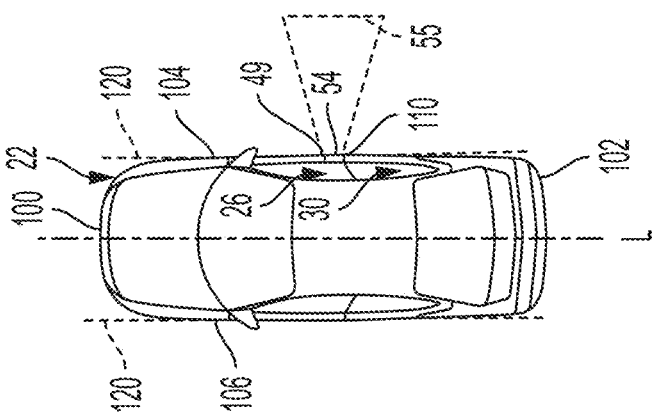

FIGS. 3 and 4 illustrate the radar field 55 or detection zone for two example locations of the at least one radar unit 52, 54. Specifically, FIG. 3 illustrates the outside mirror radar unit 52 mounted to or within an outside mirror 53 and the corresponding radar field 55. FIG. 4 illustratively shows the handle radar unit 54 within handle 49 and the radar field 55 facing outwardly from the door 26. Thus, the at least one radar unit 52, 54 is configured to transmit emitted radar signals defining the radar field 55 in a space adjacent a closure member 26, 30 of the motor vehicle 22 and receive the emitted radar signals reflected from an obstacle 33 as reflected radar signals representative of the obstacle 33.

The first electronic control unit 32 can, for example, receive the power opening signal from the internal/external handle switch 44, 46 to initiate an opening or closing of vehicle door 26. Upon receiving the power opening signal, first electronic control unit 32 can proceed to provide a signal to the electric motor (e.g., of first power actuator 60) in the form of a pulse width modulated voltage, for instance, (for speed control) to turn on the motor and initiate pivotal swinging movement of vehicle door 26. Once vehicle door 26 is positioned at the desired location, the motor may be turned off and vehicle door 26 can be held at that location (i.e., door check).

Figure 5:
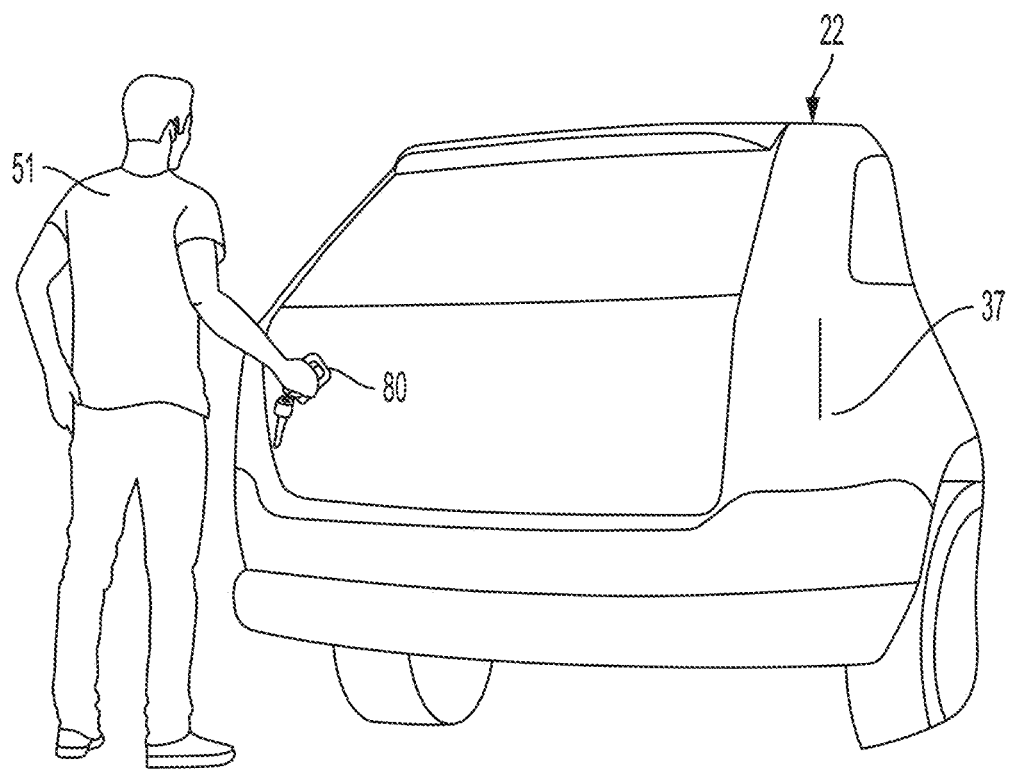
FIG. 5 is a perspective view of the motor vehicle showing a key fob associated with the motor vehicle according to aspects of the disclosure.

As best shown in FIG. 5, a key fob 80 may be associated with the motor vehicle 22. Thus, the power opening signal can, for example, be a command from or a sensing when the key fob 80 is located within a predetermined distance of the motor vehicle 22 (e.g., when the key fob 80 is in possession of the user 51 approaching the motor vehicle 22). Although the key fob 80 is used in the example embodiment, another component associated with the specific motor vehicle 22 and which can be detected by the motor vehicle 22 could be used or it may be possible to otherwise provide the power opening signal without using the key fob 80.

As discussed above, the first electronic control unit 32 also receives additional input from the at least one radar unit 52, 54 (e.g., even before powered movement of the door 26, 30 begins). The at least one radar unit 52, 54, for example, detects if the obstacle 33, such as another car, tree, or post, is near or in close proximity to vehicle door 26. If such an obstacle 33 is detected, the at least one radar unit 52, 54 will send the reflected radar signals representative of the obstacle 33 to the first electronic control unit 32, and first electronic control unit 32 will proceed to control the electric motor (e.g., to prevent movement of vehicle door 26, and thus prevent vehicle door 26 from hitting the obstacle 33).

The at least one radar unit 52, 54 is configured for detection of obstacles 33 (e.g., static poles, vehicles, walls, curbs, etc.). The at least one radar unit 52, 54 has illustrative operating parameters including −40 degrees to +85 degrees Celsius operation, 9 to 16 Volt operation, minimum detection range of 2 cm, maximum detection range of 15 meters, range resolution of 4 cm. Nevertheless, alternative sensors, sensing technology (e.g., LIDAR), and arrangements of the at least one radar unit 52, 54 are contemplated.

Figure 6:
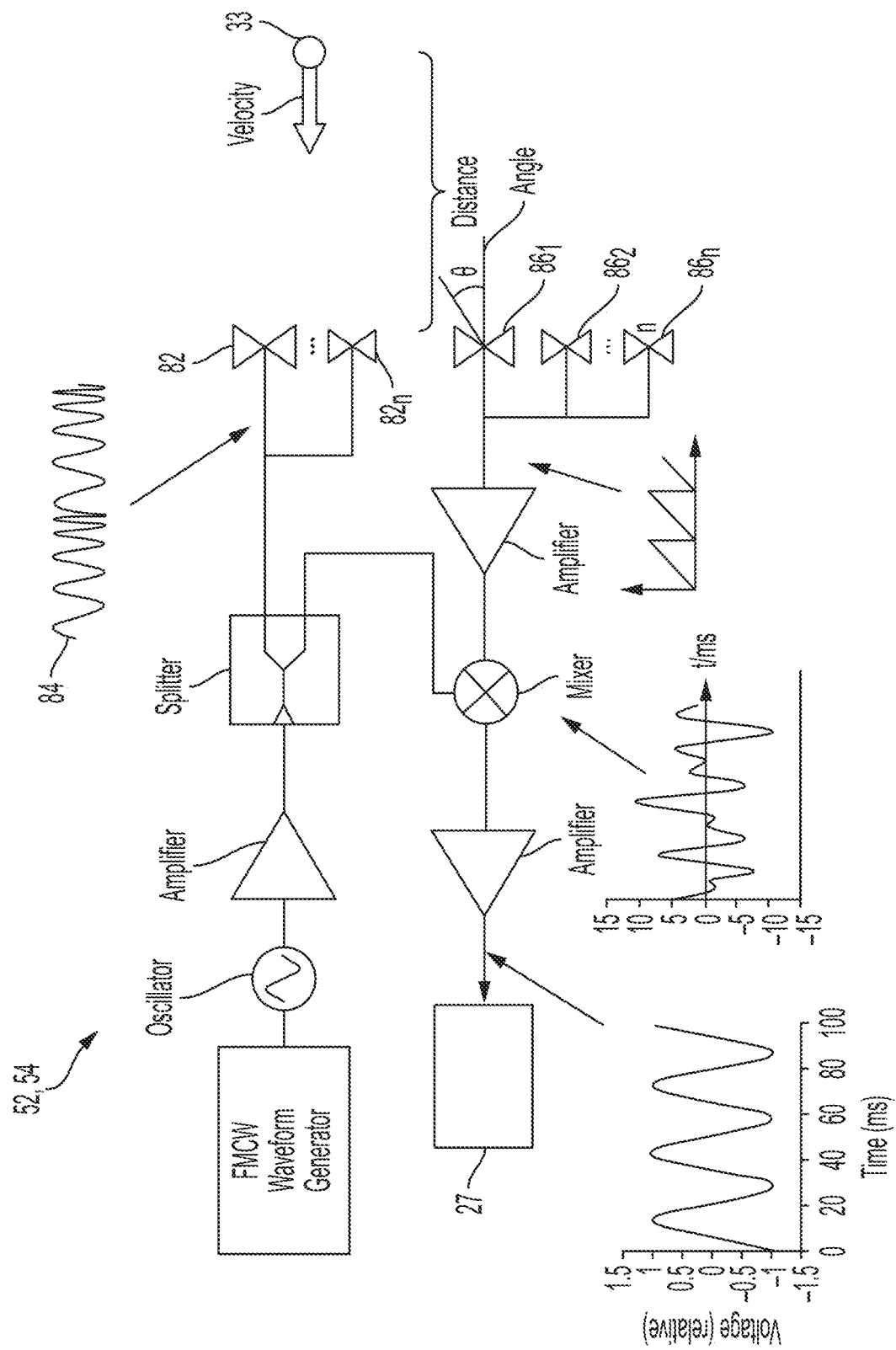
FIG. 6 is a schematic diagram of a frequency modulated continuous wave (FMCW) radar unit according to aspects of the disclosure.

Now referring to FIG. 6, there is shown an example circuit diagram of the at least one radar unit 52, 54 configured for frequency modulated continuous wave (FMCW) radar. In other words, the at least one radar unit 52, 54 is configured as a frequency modulated continuous wave radar unit 52, 54. In this example, the at least one radar unit 52, 54 employs at least one transmit antenna $82\text{-}82_n$ for transmitting the FMCW radar signal 84, and at least one receive antennas $86_1, 86_2, \ldots 86_n$ for receiving the reflected radar signal. With such a configuration, the detection system 20 is operable to detect motion of the object or obstacle 33 using the Frequency Modulated Radar techniques (i.e., processing by a signal processor 88, such as the first electronic control unit 32, of the reflected FMCW radar signal to determine frequency shifts indicative of the speed (Doppler frequency) and distance (beat frequency) of the obstacle 33). The captured received reflected electromagnetic signals can be processed by the first electronic control unit 32 to extract a data set containing data relating to the distance and angles of the motion/obstacle 33 relative to the at least one receive antennas $86_1, 86_2, \ldots 86_n$. Thus, the at least one radar unit 52, 54 can transmit and sense Continuous Wave (CW) radar, Frequency-Modulated Continuous-Wave (FMCW) radar; however, other types of radar can alternatively be used, continuous, pulsed or otherwise.

Figure 6A:
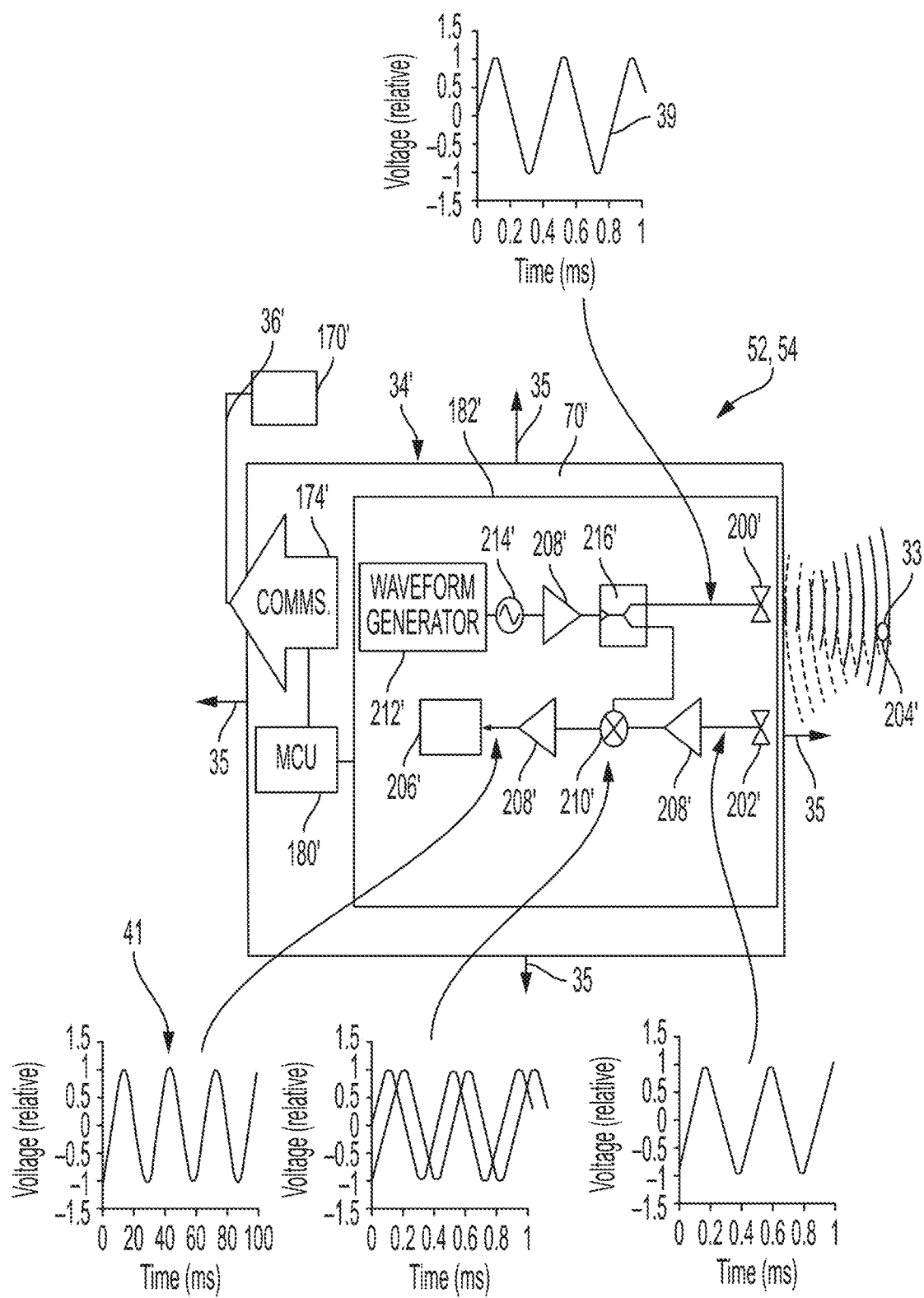
FIG. 6A is a schematic diagram of a continuous wave (CW) radar unit according to aspects of the disclosure.

Now referring to FIG. 6A, there is shown a block diagram illustrating the at least one radar unit 52, 54 configured for transmitting and detecting radio waves for providing a radio azimuth direction and ranging detection system according to an illustrative aspect of the disclosure. For example, FIG. 6A illustrates electrical components within the at least one radar unit 52, 54. In some embodiments, the at least one radar unit 52, 54 can be configured to emit continuously modulated radiation, ultra-wideband radiation, or sub-millimeter-frequency radiation (e.g., frequencies forming part of the ISM frequency band about 24 GHz, or the 60 GHz, or the 80 Hz frequency band as examples, but other ranges are also contemplated). For example, the at least one radar unit 52, 54 may be configured to emit continuously emitted radiation by a radar emitting element 200', such as an antenna, or continuous wave (CW) radar, known in the art to use Doppler radar techniques, which can be employed in the electromagnetic waves based sensor system described herein.

As shown in FIG. 6A, the at least one radar unit 52, 54 includes a radar transceiver 182' configured to transmit and receive radar waves. The radar transceiver 182' includes a radar emitting element 200' configured to emit radio frequency (RF) radiation. Radar emitting element 200' may include multiple radar emitting elements 200' (see FIG. 6), such as radar patch antenna(s) provided on the printed circuit board of radar module 34'. Continuous wave (CW) radar, also known in the art to use Doppler radar techniques, may also be employed in the radar transceiver 182' illustrated in FIG. 6A. The radar emitting element 200' may be integrated into the sensor printed circuit board 70', or integrated into a radar chip affixed to the sensor printed circuit board 70'. In some embodiments, the radar module 34' may be configured to emit and detect continuous wave (CW) radar with the at least one radar unit 52, 54 including one transmit antenna 200' and one receive antenna 202'. With such a configuration, the radar module 34' may be configured to detect a speed/velocity of the object 204 using the Doppler Radar principles (i.e., processing by controller 170', such as an electronic latch assembly ECU, a door node ECU or module, or a Body Control Module (BCM), or the like, or a dedicated local application specific radar signal processor 180', of the received reflected CW radar signal data to determine frequency shifts of an emitted continuous radiation wave indicative of the relative speed of the object 33, 204'). The radar emitting element 200' can be also configured to emit frequency modulated continuous wave (FMCW) radar. With such a configuration, the radar sensor is operable to detect relative motion characteristics of the obstacle 33, 204' using Frequency Modulated Radar techniques, such as its relative speed or velocity, its relative distance, its relative angle, as compared to the radar transceiver 182, and its size or reflectivity, as examples.

The radar transceiver 182' also includes a signal processor 206' disposed in communication with the antenna element(s) 202' through signal processing elements such as high/low gain signal amplifiers 208', a mixer 210' configured to mix the received signal with a transmitted signal generated by a waveform generator 212' and modified by an oscillator 214' and received from a splitter 216' for processing the received reflections (i.e., the signal processor 206' or the radar controller 180' can be configured to execute instructions stored in a memory to perform calculations on the received reflection and transmitted radiation signals (i.e., mixed signals) to implement the various detection techniques or algorithms, for example CW Radar, FMCW Radar, time of flight algorithms within the intermediate radar field, for example the sensing zones described herein, to provide data for determining the relative motion, speed, distance, positions and direction of the object 33, 204'. For example, the signal processor 206' and/or the radar controller 180' can be configured to process the received reflection, or the raw and unprocessed received radar signal (e.g., sensor signal 64'), to determine a Doppler shift for calculating the relative speed/velocity of the object 204', or a frequency shift for calculating the relative distance and speed of the object 204'. It is understood that the signal processor 206' and/or the radar controller 180' may be combined as one computing unit.

A scanning actuator 108 is configured to move the antenna element(s) 202', for example by moving the sensor printed circuit board 70' directly, or indirectly by moving any intermediary structure supporting the sensor printed circuit board 70'. For example the at least one radar unit 52, 54 may be moved by the scanning actuator 108 the vehicle accessory to which the at least one radar unit 52, 54 is mounted may be moved, the sensor printed circuit board 70' itself may be moved, as examples. Therefore, the shifts in frequencies between the transmitted and received waves reflected from a static object may not be created by the static object 33, but rather by the motion of the at least one radar unit 52, 54 relative to the static object 33 illustrated using arrows 35 of FIG. 6A, the motion 35 may be in various directions (e.g., up, down, left, right, side to side, or a combination thereof). CW transmitted signal 39 is shifted due to the relative moving of the at least one radar unit 52, 54 to generated a discernable frequency shift represented by signal graph 41.

Figure 7:
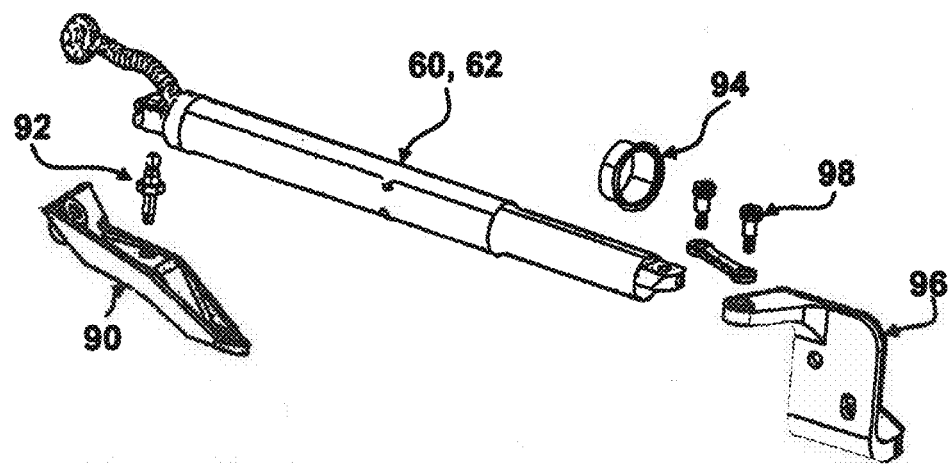
FIG. 7 is a perspective view of at least one power actuator of the non-contact obstacle detection system including associated attachment hardware according to aspects of the disclosure.

FIG. 7 shows an exemplary power actuator that may be used for the first and second power actuators 60, 62 including associated attachment hardware. Specifically, the first and second power actuators 60, 62 each include a mounting bracket 90 for attachment to the closure member 26, 30 and a ball stud attachment 92 for attachment to one end of first power actuator 60. A door retainer 94 is coupled with the each of the power actuators 60, 62. The first and second power actuators 60, 62 also each include a hinge link bracket 96 mounted to the vehicle body 37. A second end of the first power actuator 60 includes the extensible member 74 connected to the hinge link bracket 96 by a shoulder bolt attachment 98. Other power actuator arrangements are contemplated. For, example, the power actuator with articulating linkage mechanism as described in U.S. Publication No. US-2017-0292310 and/or U.S. Pat. No. 9,174,517 (which are hereby incorporated herein by reference in their entireties) may also be used.

Referring back to FIG. 4, the motor vehicle 22 extends along a longitudinal axis L from a front 100 of the motor vehicle 22 to a rear 102 of the motor vehicle 22 and laterally from the longitudinal axis L to first and second sides 104, 106 of the motor vehicle 22. The first and second sides 104, 106 extend transverse to and along the longitudinal axis L. As discussed, the at least one radar unit 52, 54 is disposed along one of the first and second sides 104, 106 of the motor vehicle 22.

Some of the obstacles 33 encountered by the detection system 20 for powered movement of the closure member 26, 30 are static objects (i.e., the obstacles 33 are stationary and do not move). However, Doppler radar, for example, is best suited to detecting objects moving with a relative velocity. While a relative velocity can be developed as the at least one radar unit 52, 54 mounted to the closure member 26, 30 moves along with the moving closure member 26, 30, such movement of the closure member 26, 30 may be undesirable. For instance, the presence of the obstacle 33 that is static may be not be detected using the at least one radar unit 52, 54 until the closure member 26, 30 begins to move. Depending on the proximity of the obstacle 33 to the closure member 26, 30, such detection may occur too late to prevent the closure member 26, 30 from contacting the obstacle 33.

Thus, the detection system 20 also includes the scanning actuator 108 coupled to the at least one radar unit 52, 54. The scanning actuator 108 is configured to move the at least one radar unit 52, 54 relative to the motor vehicle 22 independently of movement of the closure member 26, 30. Consequently, a frequency variation between the transmitted radar signals and the reflected radar signals is created indicative of a relative velocity shift between the at least one radar unit 52, 54 and the obstacle 33. The at least one electronic control unit 32, 34 is coupled to the scanning actuator 108 and the at least one power actuator 60, 62 and is configured to move the at least one radar unit 52, 54 using the scanning actuator 108 while transmitting the emitted radar signals and receiving the emitted radar signals reflected from the obstacle 33 with the at least one radar unit 52, 54. The at least one electronic control unit 32, 34 detects the obstacle 33 in the space adjacent the closure member 26, 30 using the at least one radar unit 52, 54 and controls movement of the closure member 26, 30 using the at least one power actuator 60, 62 based on the detection of the obstacle 33.

According to an aspect and best shown in FIG. 8, the at least one radar unit 52, 54 is disposed in a handle 49, 57 of the closure member 26, 30 extending along one of the first and second sides 104, 106 of the motor vehicle 22 (first side 104 including the door 26 shown). The scanning actuator 108 is configured to rotate the at least one radar unit 52, 54 about a vertical rotation axis 110 transverse to the longitudinal axis L (FIG. 4) between a first vertical rotation position wherein the at least one radar unit 52, 54 is adjacent to one of the first and second sides 104, 106 of the motor vehicle 22 and a second vertical rotation position wherein the at least one radar unit 52, 54 is spaced from the one of the first and second sides 104, 106 of the motor vehicle 22 (both positions shown in FIG. 8). In more detail, the handle 49, 57 extends from a first handle end 112 to a second handle end 114 and the vertical rotation axis 110 is adjacent the first handle end 112.

Thus, the scanning actuator 108 is configured to simultaneously rotate the handle 49, 57 and the at least one radar unit 52, 54 about the vertical rotation axis 110 in a handle opening path between a vertical rotation handle closed position (i.e., the first vertical rotation position) wherein the second handle end 114 is adjacent to the closure member 26, 30 and a vertical rotation handle open position (i.e., the second vertical rotation position) wherein the second handle end 114 is spaced from the closure member 26, 30. During the rotation of the handle 49, 57, the at least one radar unit 52, 54 is scanning for objects or obstacles 33 in a path of the closure member 26, 30.

Figure 10:
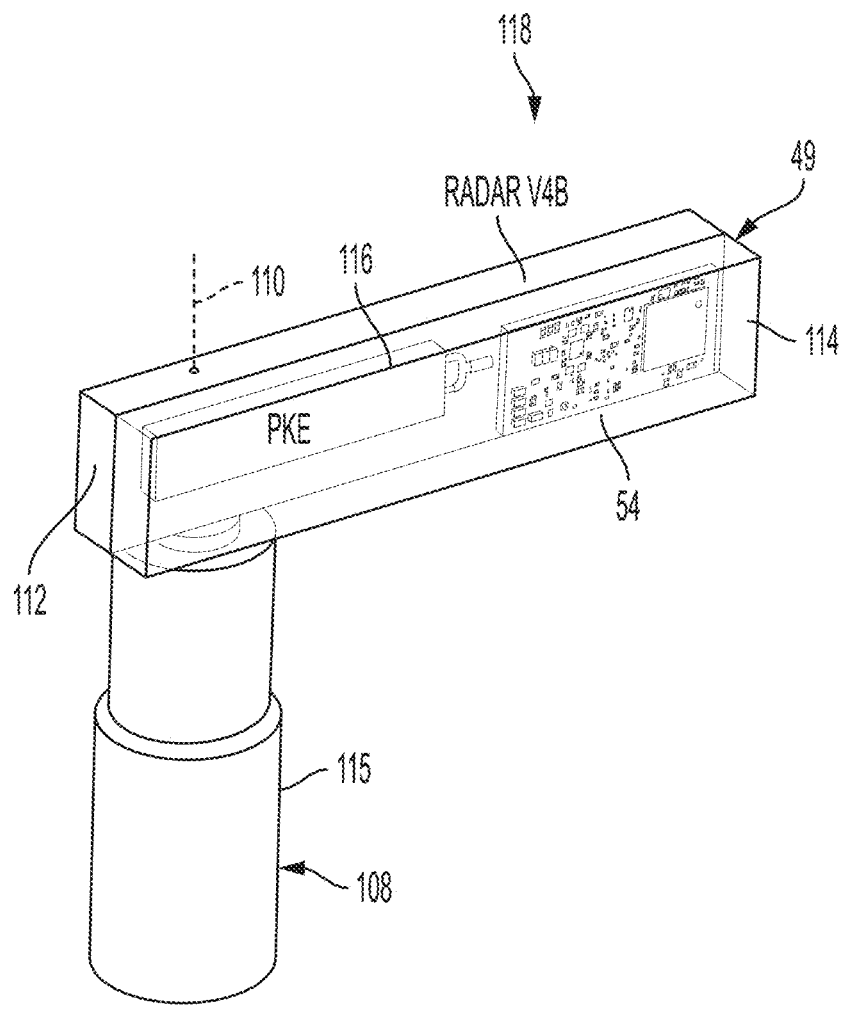
FIG. 10 is a perspective view of the scanning actuator along with the at least one radar unit and a passive keyless entry (PKE) receiver for communicating with the key fob comprising a radar assembly according to aspects of the disclosure.
Figure 11A:
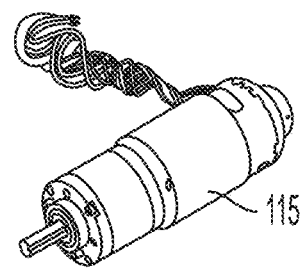
FIG. 11A is a perspective view of the motor of the scanning actuator and FIG. 11B is a table and diagram containing additional details regarding the motor of the scanning actuator according to aspects of the disclosure.
Figure 11B:
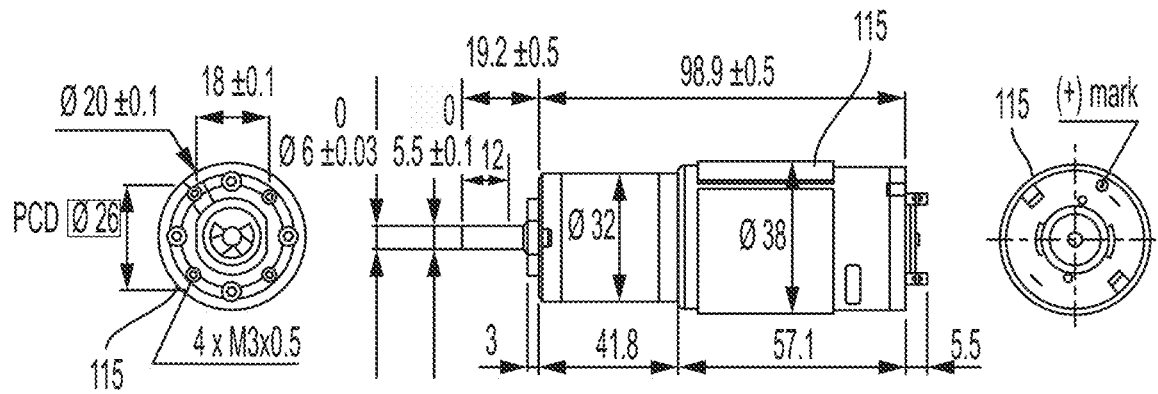

According to an aspect, the scanning actuator 108 may comprise a gear motor assembly that is back-drivable to provide manual open and close functionality. Movement of the handle 49, 57 by the scanning actuator 108 may also operate the latch 36 via a mechanical switch or force-sense for locking and unlocking. A camera (not shown) may also be integrated in the handle 49, 57. FIG. 9 shows a table showing an activation time of 0.5 seconds, speed of a motor 115 of the scanning actuator 108 being 23 revolutions per minute (RPM), and an angle of 70 degrees that the handle 49, 57 is moved when it is in its vertical rotation handle open position. FIG. 10 shows the scanning actuator 108 along with the at least one radar unit 52, 54 and a passive keyless entry (PKE) receiver 116 for communicating with the key fob 80 comprising a radar assembly 118. FIGS. 11A and 11B show additional details regarding the motor 115 of the scanning actuator 108. While the scanning actuator 108 may be a motor, it should be appreciated that the scanning actuator 108 may additionally or alternatively comprise a solenoid or electromagnet.

Figure 12:
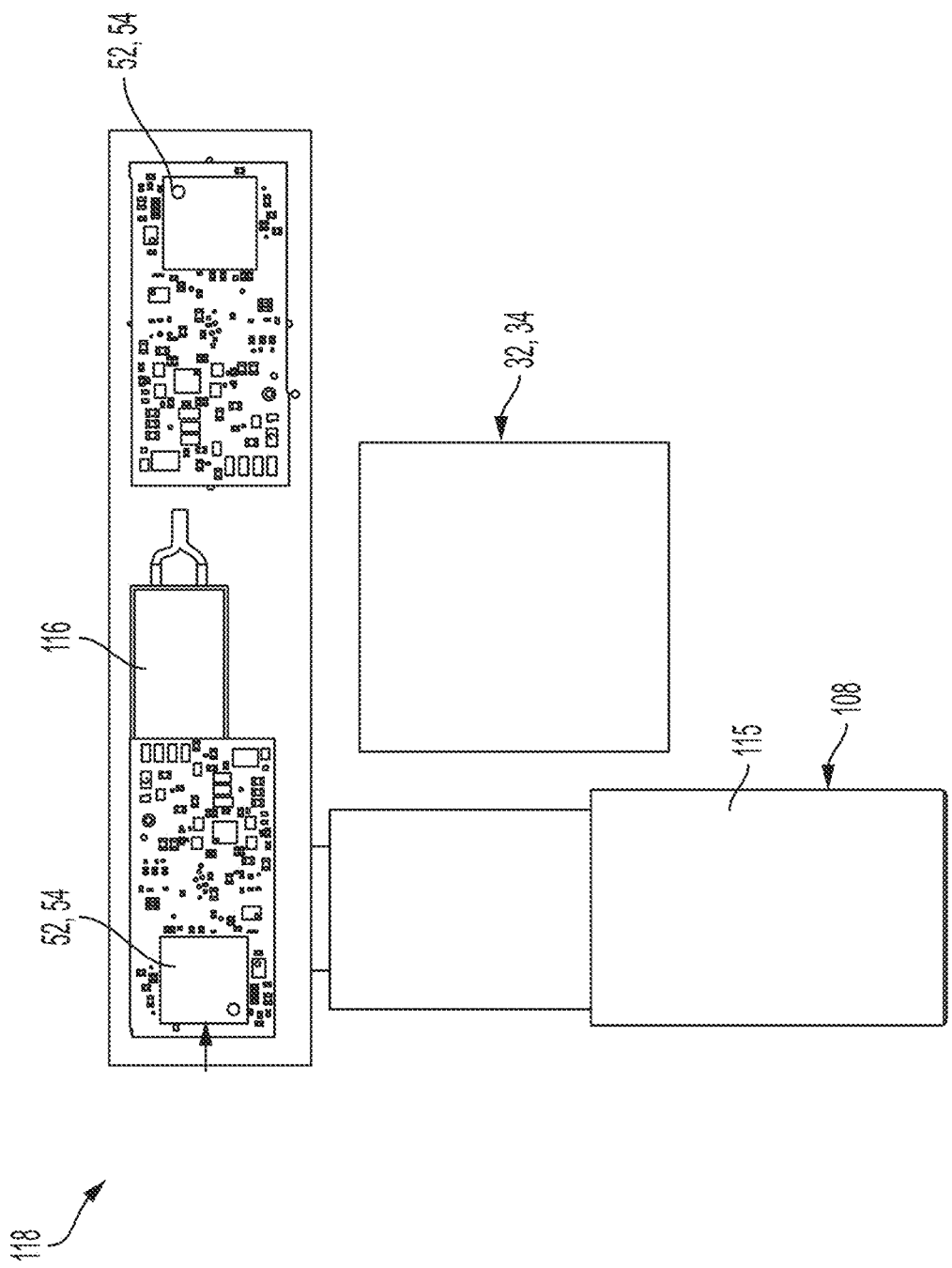
FIG. 12 is a side elevation view of the scanning actuator with at least one electronic control unit in communication with the scanning actuator and the at least one radar unit for controlling the scanning actuator and the at least one radar unit according to aspects of the disclosure.

As shown in FIG. 12, the at least one electronic control unit 32, 34 is in communication with the scanning actuator 108 and the at least one radar unit 52, 54 for controlling the scanning actuator 108 and the at least one radar unit 52, 54. The at least one electronic control unit 32, 34 can additionally be powered by a backup energy source (e.g., super capacitors) and may additionally monitor and/or control handle functions, operation of latches 36, 40 and window regulators for power window operation.

Figure 13:
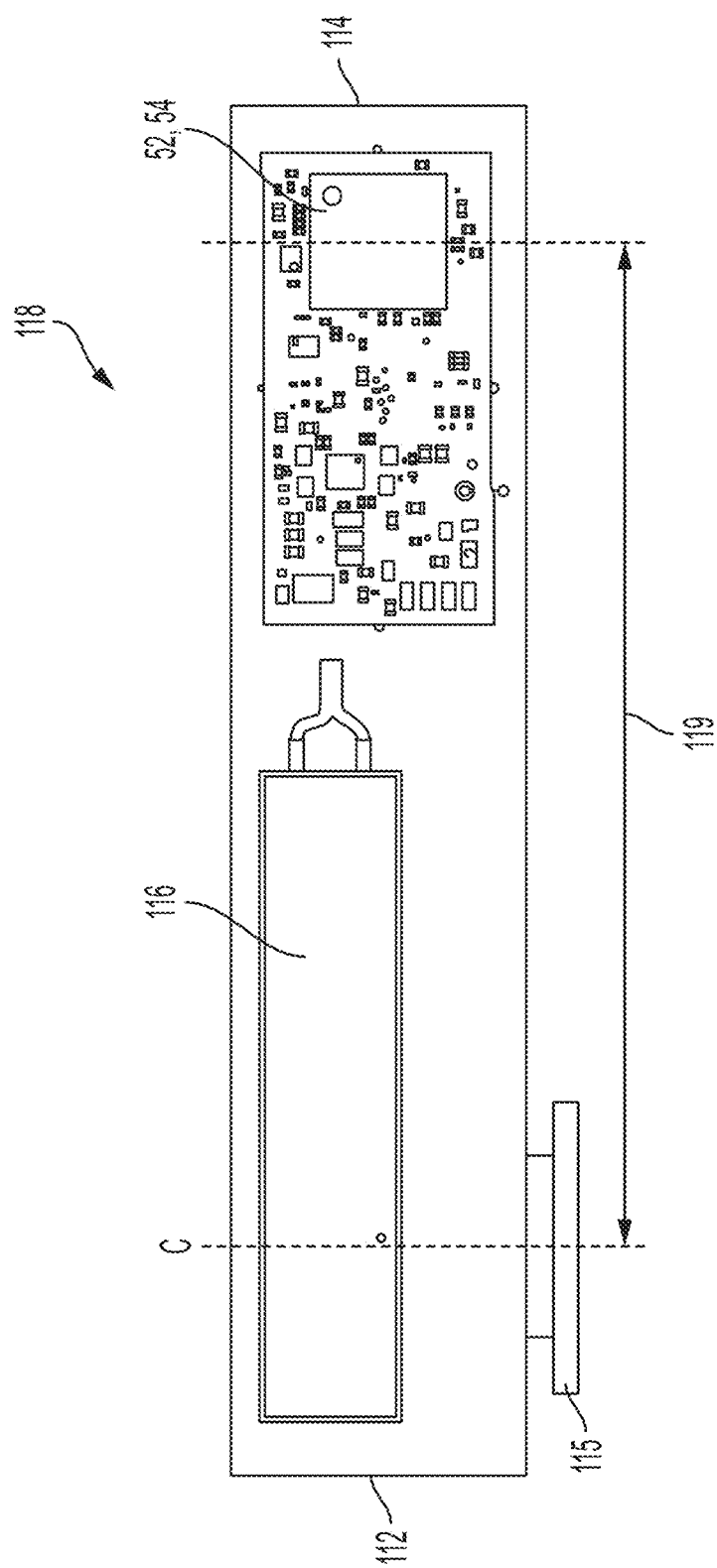
FIG. 13 is a partial side elevation view of the scanning actuator with the at least one radar unit spaced from a centerline of the motor of the scanning actuator according to aspects of the disclosure.

In addition, the at least one radar unit 52, 54 can comprise a plurality of radar units 52, 54 (e.g., stereo radar detection), each with at least one transmit antenna $82\text{-}82_n$ for transmitting the radar signal 84, and at least one receive antennas $86_1, 86_2, \ldots 86_n$ for receiving the reflected radar signal 84. As shown in FIG. 13, the at least one radar unit 52, 54 can be spaced from a centerline C of the motor 115 of the scanning actuator 108 (e.g., coaxial with the vertical rotation axis 110) by a vertical rotation spacing distance 119, that may for example, be 100 millimeters. Other vertical rotation spacing distances 119 may be utilized.

Thus, for example, a power door opening sequence can include a remote activation of the power door (e.g., using the keyfob 80). A scan using the at least one radar unit 52, 54 is activated and the motor 115 drives the handle 49, 57 to open (e.g., 70 degrees), as long as no obstacles 33 are detected in the path of the opening handle 49, 57. At the same time, the scan using the at least one radar unit 52, 54 scans during the full open sweep. The handle 49, 57 closes and continues scanning using the at least one radar unit 52, 54. During the handle close cycle, the closure member 26, 30 is unlocked electronically and the latch 36, 40 is opened. The closure member 26, 30 begins power opening and the at least one radar unit 52, 54 continues scanning. The closure member 26, 30 opens to a maximum angle by determining distance to obstacles 33 and adding a safety buffer. Additionally, stereo radar units 52, 54 could also be installed in the handle 49, 57 (FIG. 12) for improved object detection. Similarly, the outside mirror 53 could power open or close to provide the rotation of the scan using the at least one radar unit 52, 54.

Figure 14A:
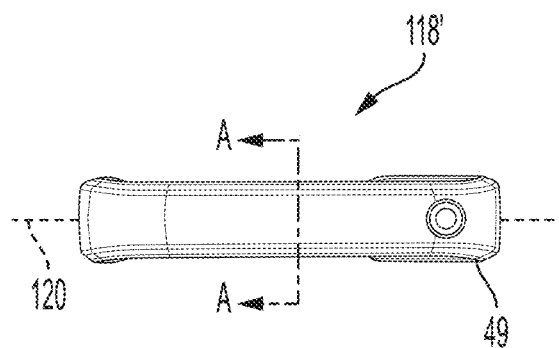
FIGS. 14A-14D, 15 and 16 are various views and diagrams of the at least one radar unit disposed in the handle of the closure member of the motor vehicle along with the scanning actuator configured to rotate the at least one radar unit about a horizontal rotation axis according to aspects of the disclosure.
Figure 14C:
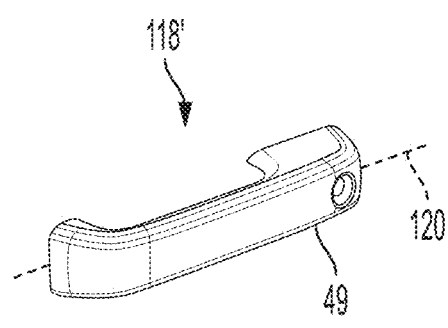
Figure 14B:
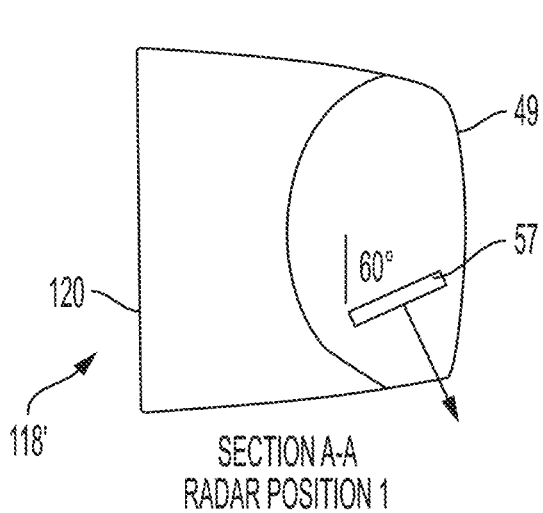
Figure 14D:
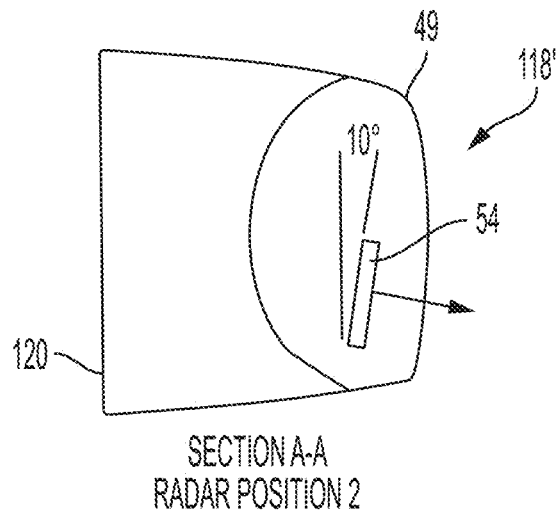

Like the radar assembly shown in FIGS. 10-13, the at least one radar unit 52, 54 of the radar assembly 118' shown in FIGS. 14A-14D, 15, and 16 is disposed in the handle 49, 57 of the closure member 26, 30 extending along one of the first and second sides 104, 106 of the motor vehicle 22 from the first handle end 112 to the second handle end 114. However, instead of the at least one radar unit 52, 54 being rotated about the vertical rotation axis 110, the at least one radar unit 52, 54 is rotatably disposed in the handle 49, 57 and the scanning actuator is configured to rotate the at least one radar unit 52, 54 about a horizontal rotation axis 120 extending along one of the first and second sides 104, 106 of the motor vehicle 22. The at least one radar unit 52, 54 is rotated by the scanning actuator between a first horizontal radar rotation position wherein the at least one radar unit 52, 54 is angled relative to the closure member 26, 30 at a first horizontal radar rotation angle (FIG. 14B) and a second horizontal radar rotation position wherein the radar unit is angled relative to the closure member 26, 30 at a second horizontal radar rotation angle less than the first horizontal radar rotation angle (FIG. 14D). Thus, the scanning actuator is configured to rotate the at least one radar unit 52, 54 about the horizontal rotation axis 120 without rotating the handle 49, 57.

Figure 15:
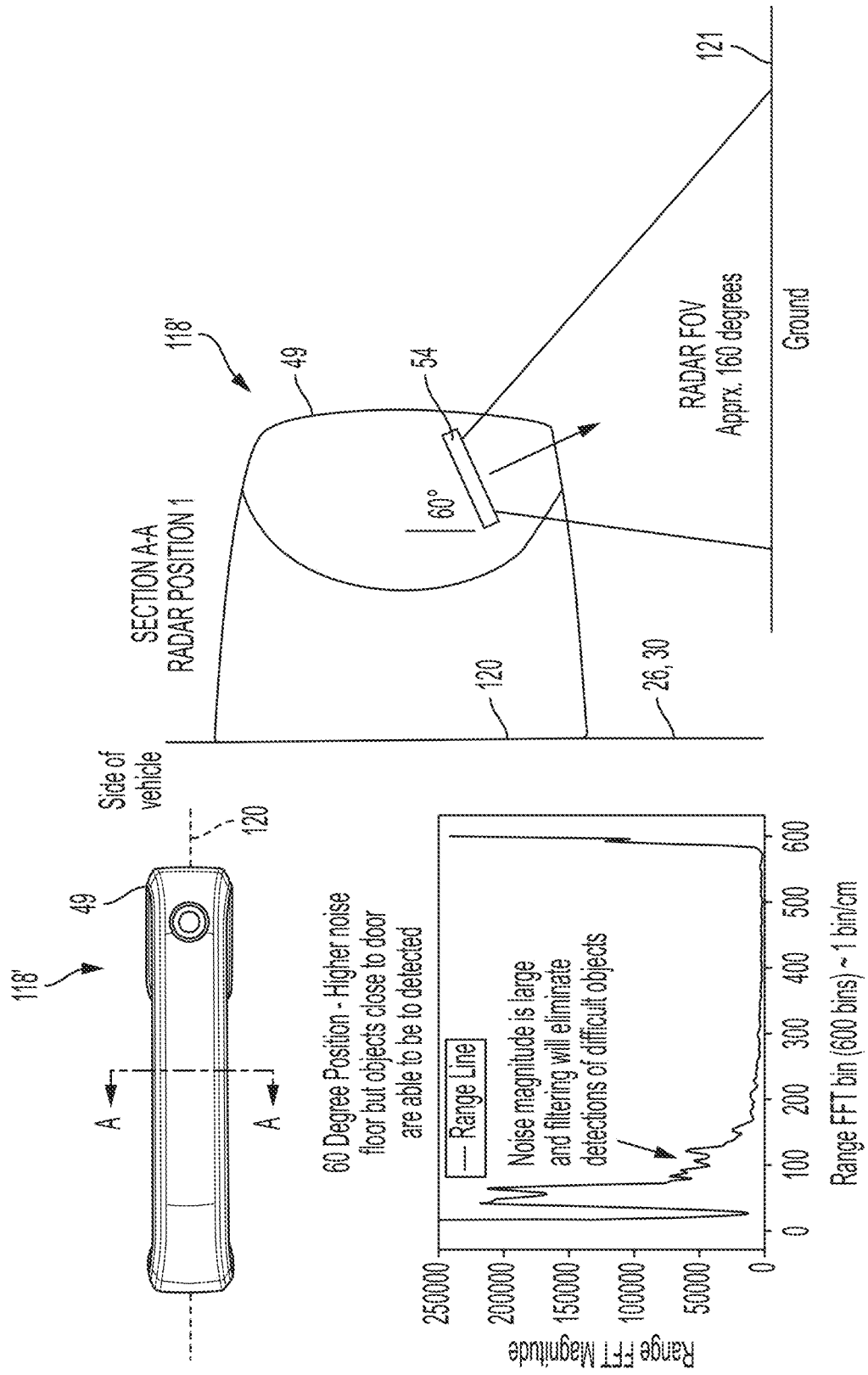

FIG. 15 shows the at least one radar unit 52, 54 in the first horizontal radar rotation position wherein the at least one radar unit 52, 54 is angled relative to the closure member 26, 30 at the first horizontal radar rotation angle (e.g., 60 degrees). To effectively detect low obstacles 33 such as curbs, it has been found that a downward angle of the at least one radar unit 52, 54 of 60 degrees is optimal. However, it is also necessary to detect obstacles 33 at higher elevations (i.e., angles smaller than 60 degrees). It has been found that a downward angle of 10 degrees is effective at detecting most taller obstacles. The field of sensing or field of view (FOV) of the at least one radar unit 52, 54 can be approximately 160 degrees and is shown facing toward a ground surface 121 in the first horizontal radar rotation position. While a noise floor may be higher when the at least one radar unit 52, 54 is in the first horizontal radar rotation position, obstacles 33 closer to the closure member 26, 30 can be detected. Thus, a noise magnitude can be relatively large. However, filtering (e.g., by at least one electronic control unit 32, 34) can eliminate detections of difficult obstacles 33. While the at least one radar unit 52, 54 is described as movable by the scanning actuator, it should be appreciated that the at least one radar unit 52, 54 could also include two radar units 52, 54 with one oriented at 10 degrees and another oriented at 60 degrees within the handle 49, 57.

Figure 16:
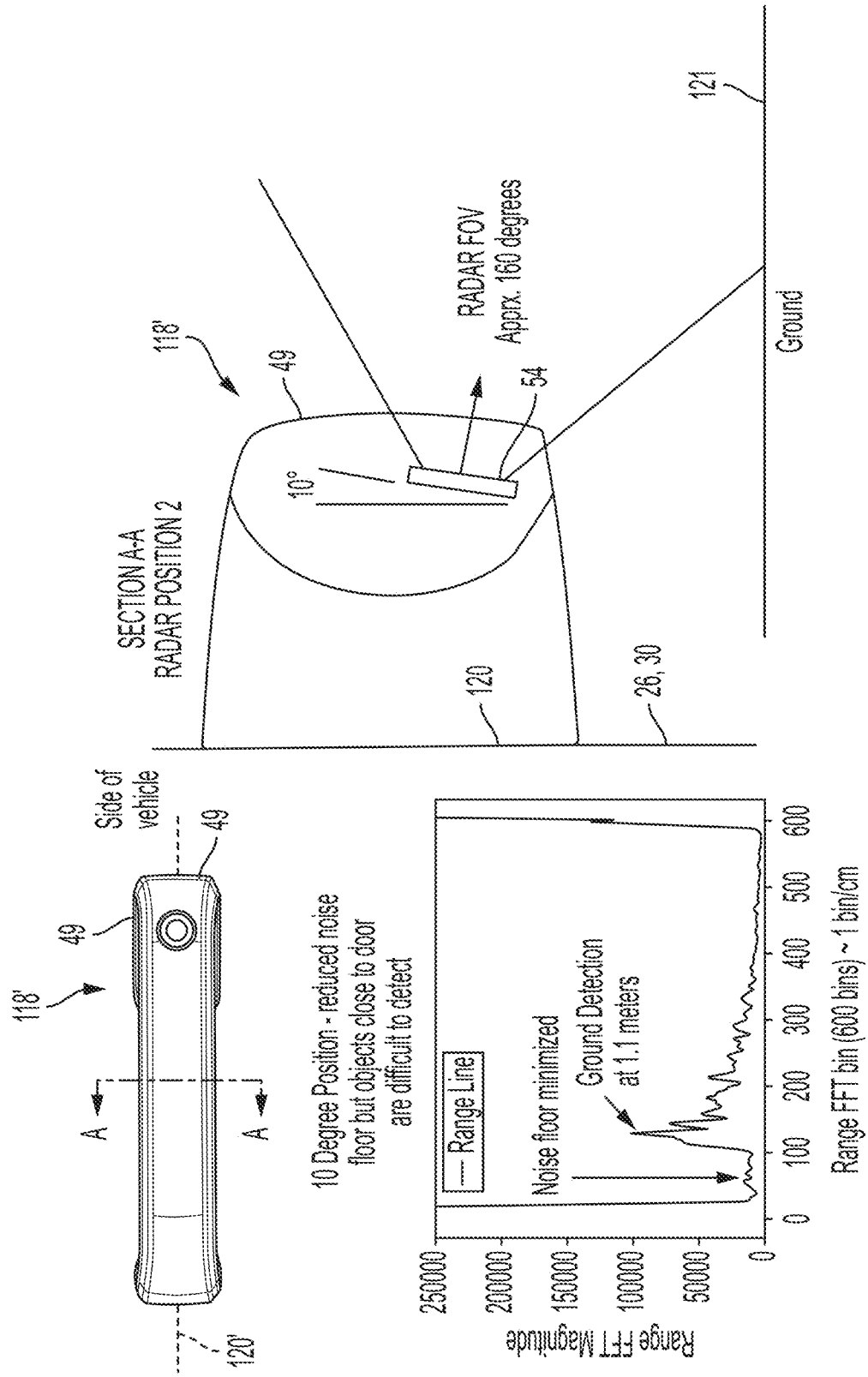

FIG. 16 shows the least one radar unit 52, 54 in the second horizontal radar rotation position wherein the at least one radar unit 52, 54 is angled relative to the closure member 26, 30 at the second horizontal radar rotation angle (e.g., 10 degrees). The field of view of the at least one radar unit 52, 54 is shown facing outwardly from the closure member 26, 30. The noise floor can be lower than the at least one radar unit 52, 54 is in the first horizontal radar rotation position when the at least one radar unit 52, 54 is in the first horizontal radar rotation position, so obstacles 33 close to the closure member 26, 30 may be more difficult to detect. For instance, a ground detection at 1.1 meters is shown.

Thus, for example, another power door opening sequence can include a remote activation of the power door (e.g., using the keyfob 80). A scan using the at least one radar unit 52, 54 is activated and the scan begins at the first horizontal radar rotation angle (e.g., 60 degrees) with a first constant false-alarm rate setting (CFAR). The scanning actuator rotates the at least one radar unit 52, 54 to the second horizontal radar rotation position in which the at least one radar unit 52, 54 is angled relative to the closure member 26, 30 at the second horizontal radar rotation angle (e.g., 10 degrees) with a second constant false-alarm rate setting. The CFAR noise floor is software-adjusted depending on the orientation of the at least one radar unit 52, 54. For example, in the 60 degree downward position (i.e., the first horizontal radar rotation position), there is more noise generated from the ground 121 so the baseline will be adjusted to suit. In the 10 degree position (i.e., the second horizontal radar rotation position), the noise from the ground 121 is lower, so the CFAR level can be reduced which improves low-radar cross section obstacle detection.

Thus, a variable-level CFAR can be used to change as the position of the at least one radar unit 52, 54 changes in the vertical direction. The handle 49, 57 can also be opened as long as no obstacles 33 are detected in the path of the opening handle 49, 57. At the same time, the scan using the at least one radar unit 52, 54 scans during the full open sweep. The handle 49, 57 closes and continues scanning using the at least one radar unit 52, 54. During the rotation of the at least one radar unit 52, 54 from the second horizontal radar rotation angle and the first horizontal radar rotation angle, the closure member 26, 30 is unlocked electronically and the latch 36, 40 is opened.

The closure member 26, 30 begins power opening after the at least one radar unit 52, 54 has completed scanning. The closure member 26, 30 opens to a maximum angle by determining distance to obstacles 33 and adding a safety buffer. For example, a distance to obstacle 33 of 1.1 meters may be determined and thus, the closure member 26, 30 may open with a safety buffer such as 0.1 or 0.25 or 0.33 or 0.5 meters such that the closure member 26, 30 will not open past a point at which the closure member 26, 30 is at or within the safety buffer distance to the detected obstacle 33. Again, stereo radar units 52, 54 could also be installed in the handle 49, 57 (FIG. 12) for improved object detection and the outside mirror 53 could power open or close to provide the rotation of the scan using the at least one radar unit 52, 54.

Figure 17:
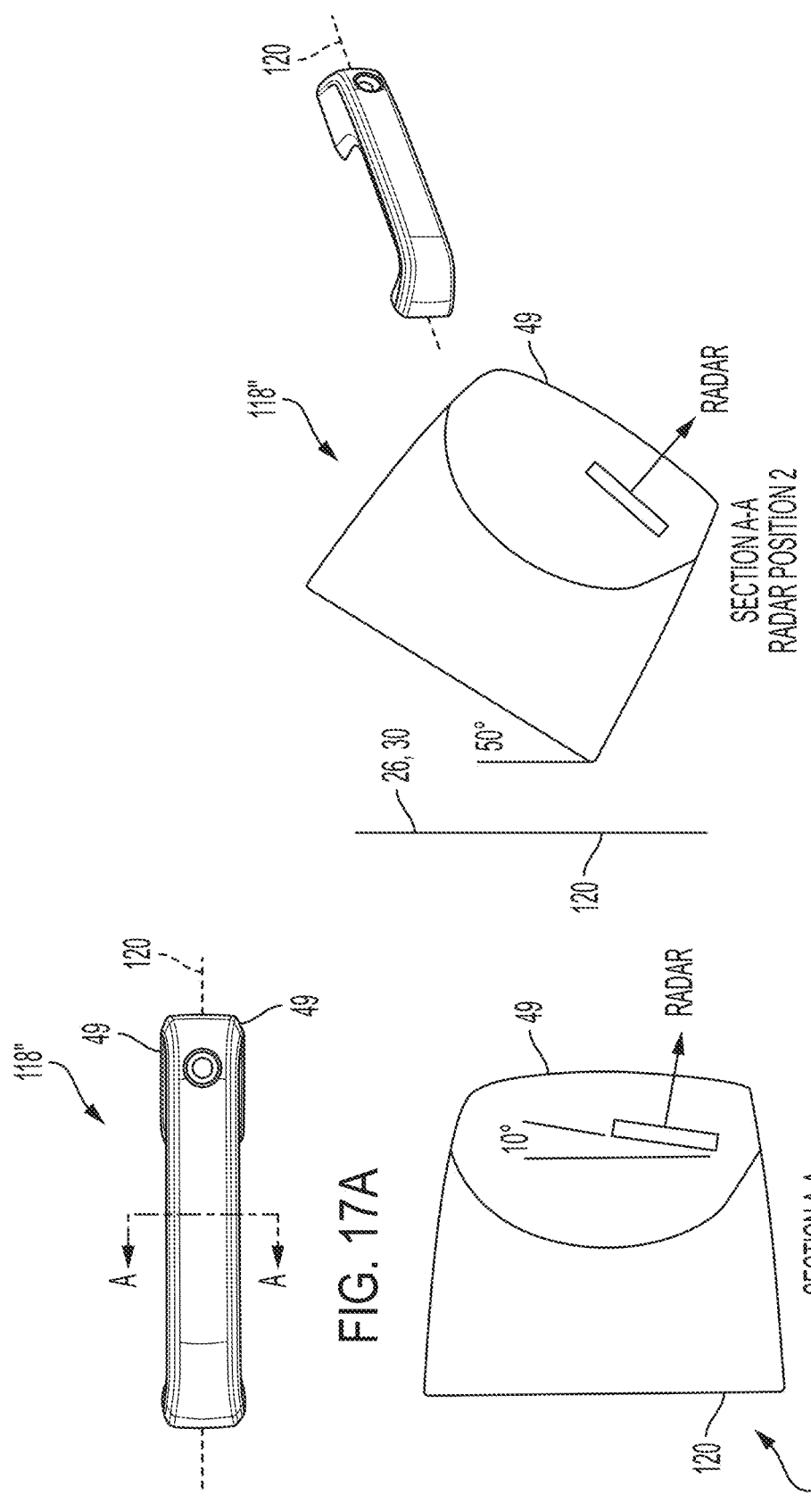
FIGS. 17A-17C are various views of the at least one radar unit disposed in the handle of the closure member of the motor vehicle along with the scanning actuator configured to rotate both the at least one radar unit and the handle about the horizontal rotation axis according to aspects of the disclosure.

Now referring to FIG. 17A-17C, another radar assembly 118" shown is disposed in the handle 49, 57 of the closure member 26, 30 extending along one of the first and second sides 104, 106 of the motor vehicle 22 from the first handle end 112 to the second handle end 114. The scanning actuator is configured to simultaneously rotate the handle 49, 57 and the at least one radar unit 52, 54 about the horizontal rotation axis 120 in a handle opening path between a horizontal rotation handle closed position (FIG. 17B) wherein the handle 49, 57 is angled relative to the closure member 26, 30 at a first horizontal handle rotation angle (e.g., 10 degrees) and a horizontal rotation handle open position (FIG. 17C) wherein the handle 49, 57 is angled relative to the closure member 26, 30 at a second horizontal handle rotation angle (e.g., 50 degrees) greater than the first horizontal handle rotation angle.

Figure 18:
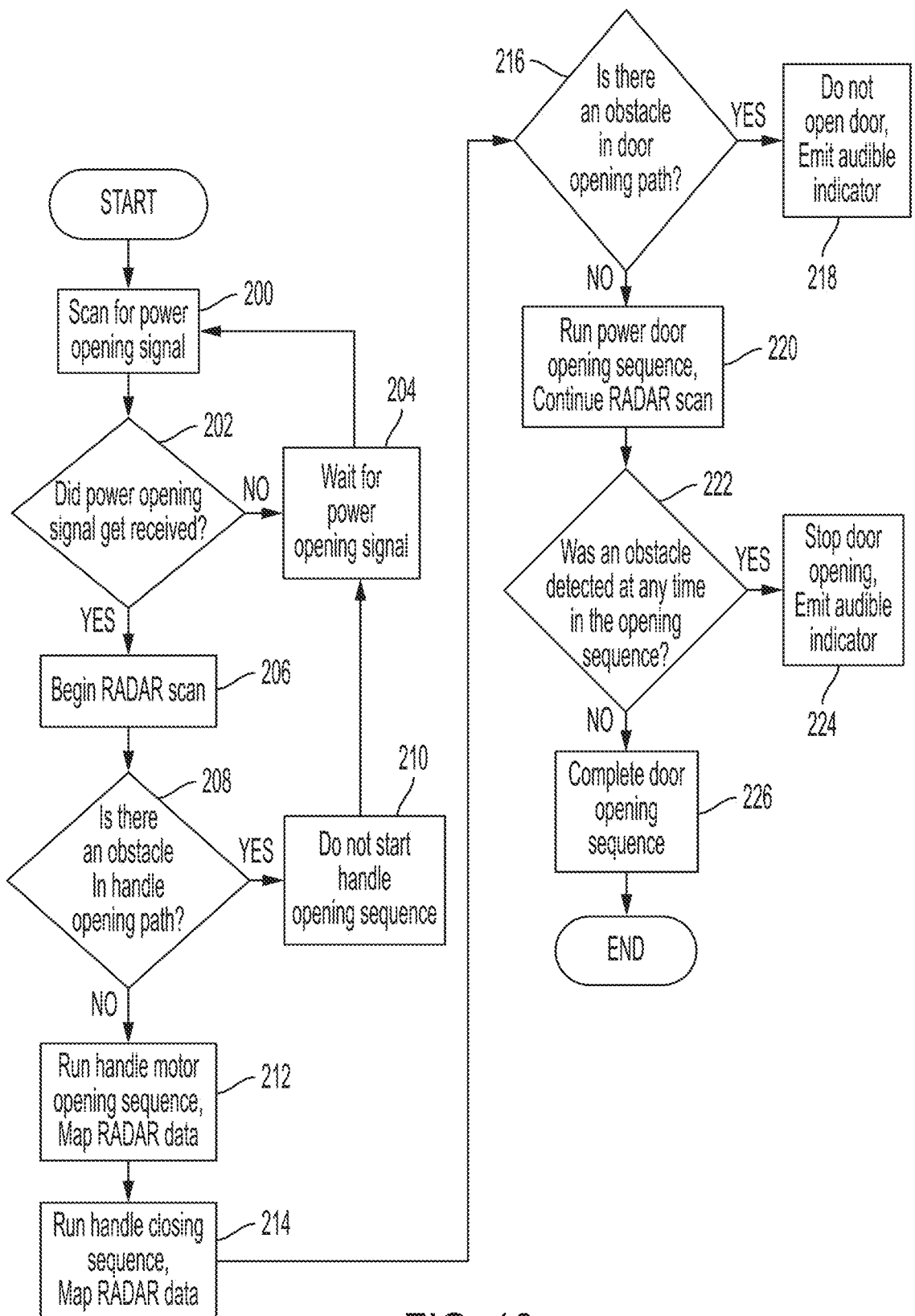
FIGS. 18-20 are flowcharts of methods of detecting the obstacle and operating the closure member of a motor vehicle according to aspects of the disclosure.
Figure 19:
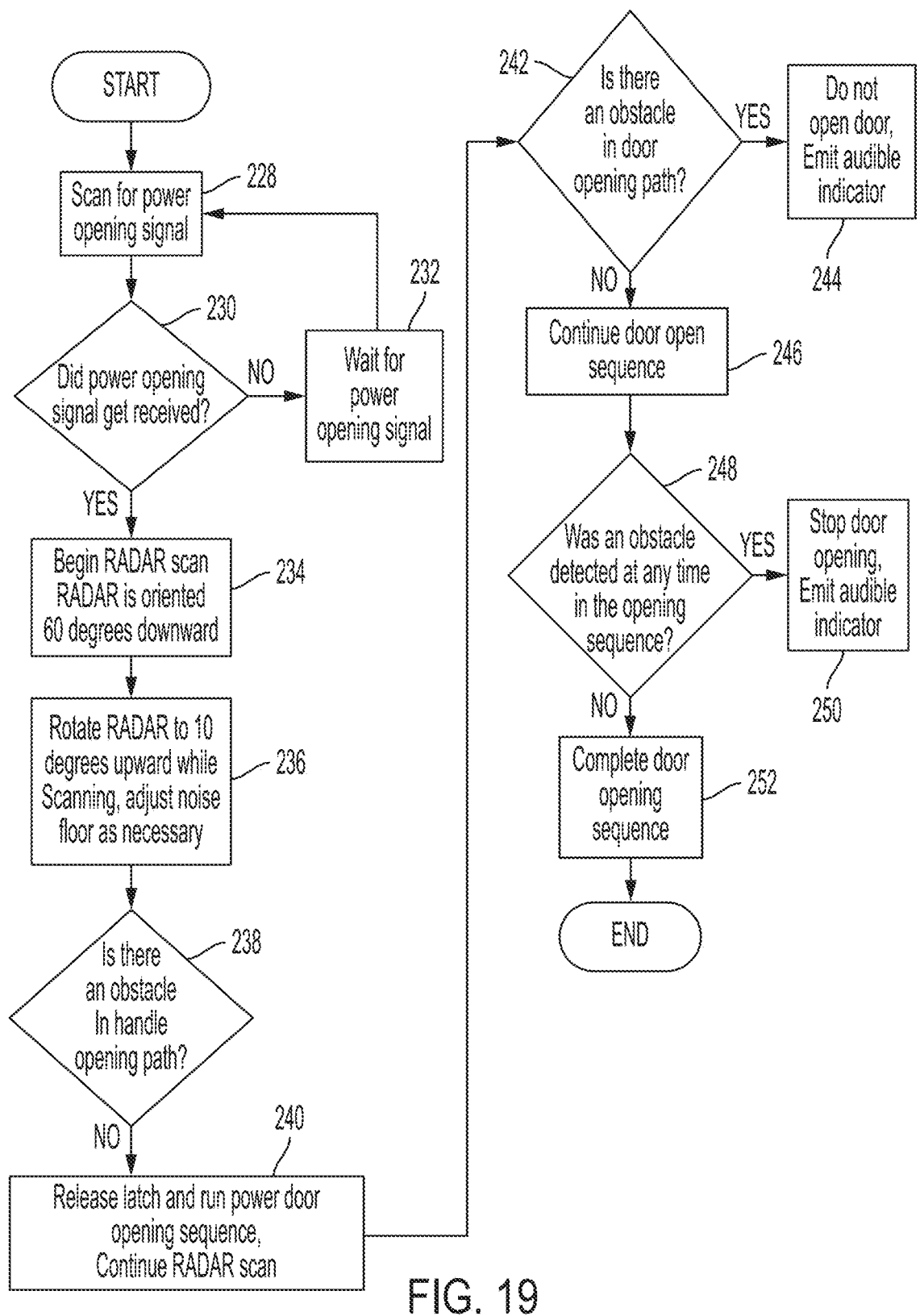
Figure 20:
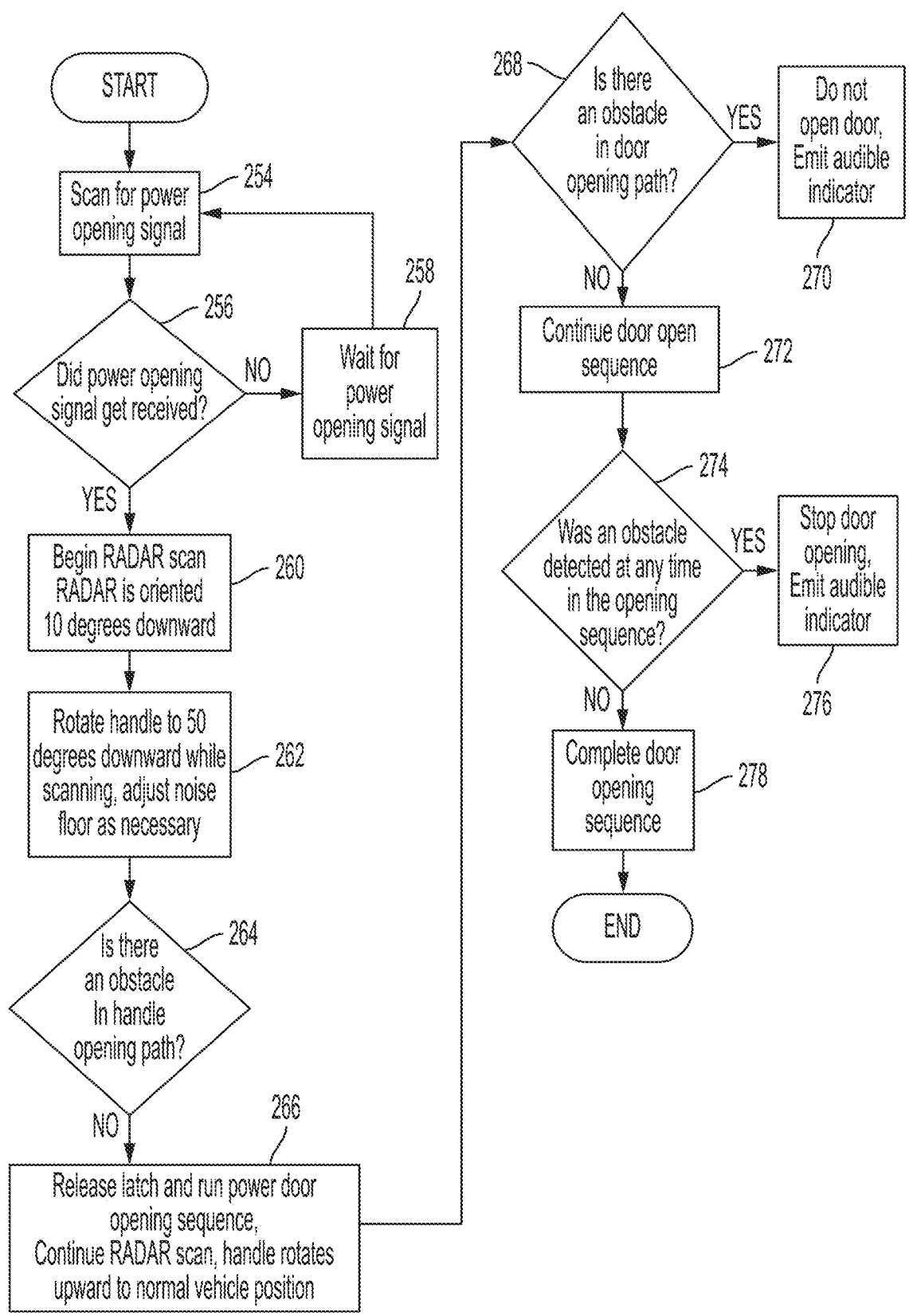

As best shown in FIGS. 18-20, a method of detecting an obstacle 33 and operating a closure member 26, 30 of a motor vehicle 22 is also provided. In general, the method includes the step of transmitting emitted radar signals in a space adjacent the closure member 26, 30 of the motor vehicle 22 and receiving the emitted radar signals reflected from the obstacle 33 using at least one radar unit 52, 54. The next step of the method is moving the at least one radar unit 52, 54 relative to the motor vehicle 22 independently of movement of the closure member 26, 30 using a scanning actuator 108 coupled to the motor vehicle 22 and to the at least one radar unit 52, 54 while transmitting the emitted radar signals and receiving the emitted radar signals to create a frequency variation between the transmitted radar signals and the reflected radar signals indicative of a relative velocity shift between the at least one radar unit 52, 54 and the obstacle 33. The next step of the method is detecting the obstacle 33 in the space adjacent the closure member 26, 30 using the at least one radar unit 52, 54. The method also includes the step of controlling movement of the closure member 26, 30 using at least one power actuator 60, 62 based on the detection of the obstacle 33.

As discussed above, the at least one radar unit 52, 54 can be disposed in the handle 49, 57 of the closure member 26, 30 extending along one of a first side and a second side of the motor vehicle 22 from the first handle end 112 to the second handle end 114. The scanning actuator 108 is configured to simultaneously rotate the handle 49, 57 and the at least one radar unit 52, 54 about the vertical rotation axis 110 in the handle opening path between the vertical rotation handle closed position, where the second handle end 114 is adjacent to the closure member 26, 30, and the vertical rotation handle open position, where the second handle end 114 is spaced from the closure member 26, 30.

Thus, and as best shown in FIG. 18, a method of detecting an obstacle 33 and operating a closure member 26, 30 of a motor vehicle 22 equipped with at least one radar unit 52, 54 and a scanning actuator 108 configured to simultaneously rotate the handle 49, 57 and radar unit 52, 54 about the vertical rotation axis 110 is provided. The method includes the step of 200 scanning for a power opening signal (e.g., from the key fob 80). Next, at 202, the system determines whether the power opening signal has been received. The method continues with the step of 204 waiting for the power opening signal and returning to the step of scanning for the power opening signal in response to determining that the power opening signal has not been received. In response to determining that the power opening signal has been received, the next step of the method is 206 initiating a scan by transmitting the emitted radar signals in the space adjacent the closure member 26, 30 of the motor vehicle 22 and receiving the emitted radar signals reflected from the obstacle 33 using the at least one radar unit 52, 54. Next, at 208, the system determines whether the obstacle 33 is in the handle opening path. Responsive to determining that an obstacle 33 is in the handle opening path, the method continues at 210 by preventing a handle opening sequence and returning to the step of 204 waiting for the power opening signal. In response to determining that no obstacle is in the handle opening path, the next step of the method is 212 initiating the handle opening sequence while transmitting the emitted radar signals and receiving the emitted radar signals reflected from the obstacle 33 and mapping the radar data. The method continues with the step of 214 initiating a handle closing sequence while transmitting the emitted radar signals and receiving the emitted radar signals reflected from the obstacle 33 and mapping the radar data. The method also includes the step of 216 determining whether the obstacle 33 is in a closure member opening path. Then, responsive to determining that the obstacle 33 is in the closure member path, the next step of the method is 218 preventing opening of the closure member 26, 30 and emitting an audible indicator (e.g., using the audible indication unit 79 shown in FIG. 2). Responsive to determining that the an obstacle is not in the closure member opening path, the method proceeds at 220 by initiating movement of the closure member 26, 30 in an opening sequence using the at least one power actuator 60, 62 while transmitting the emitted radar signals and receiving the emitted radar signals reflected from the obstacle 33. Next, at 222, the system determines whether the obstacle 33 is detected during the opening sequence. Responsive to determining that an obstacle 33 is detected during the opening sequence, the method continues with the step of 224 stopping movement of the closure member 26, 30 and emitting an audible indicator. If no obstacle is detected during the opening sequence, the method continues with the step of 226 completing the movement of the closure member 26, 30.

As discussed, the scanning actuator is instead configured to rotate the radar unit 52, 54 about a horizontal rotation axis 120 extending along one of the first and second sides 104, 106 of the motor vehicle 22 between a first horizontal radar rotation position wherein the radar unit 52, 54 is angled relative to the closure member 26, 30 at a first horizontal radar rotation angle and a second horizontal radar rotation position wherein the at least one radar unit 52, 54 is angled relative to the closure member 26, 30 at a second horizontal radar rotation angle less than the first horizontal radar rotation angle without rotating the handle 49, 57.

Thus, and as best shown in FIG. 19, a method of detecting an obstacle 33 and operating a closure member 26, 30 of a motor vehicle 22 equipped with at least one radar unit 52, 54 and a scanning actuator configured to rotate radar unit 52, 54 about the horizontal rotation axis 120 (without rotating the handle 49, 57) is provided. The method includes the steps of 228 scanning for a power opening signal and 230 determining whether the power opening signal has been received. The next step of the method is 232 waiting for the power opening signal and returning to the step of scanning for the power opening signal in response to determining that the power opening signal has not been received. Responsive to determining that the power opening signal has been received, the method proceeds by 234 initiating a scan by transmitting the emitted radar signals in the space adjacent the closure member 26, 30 of the motor vehicle 22 and receiving the emitted radar signals reflected from the obstacle 33 using the radar unit 52, 54 with the radar unit 52, 54 being in the first horizontal rotation position (e.g., 60 degrees). The method continues with the step of 236 transmitting the emitted radar signals in the space adjacent the closure member 26, 30 of the motor vehicle 22 and receiving the emitted radar signals reflected from the obstacle 33 using the radar unit 52, 54 while rotating the radar unit 52, 54 to the second horizontal rotation position (e.g., 10 degrees) and adjusting a noise floor as necessary. Next, 238 determining whether the obstacle 33 is in a handle opening path and, responsive to determining that no obstacle is in the handle opening path, 240 releasing a latch of the closure member 26, 30 and initiating movement of the closure member 26, 30 in an opening sequence using the at least one power actuator 60, 62 while transmitting the emitted radar signals and receiving the emitted radar signals reflected from the obstacle 33. The method continues by 242 determining whether the obstacle 33 is in a closure member opening path and, responsive to determining that an obstacle 33 is in the closure member opening path, 244 preventing opening of the closure member 26, 30 and emitting an audible indicator. Responsive to determining that no obstacle is in the closure member opening path, the next step of the method is 246 continuing movement of the closure member 26, 30 in the opening sequence using the at least one power actuator 60, 62 while transmitting the emitted radar signals and receiving the emitted radar signals reflected from the obstacle 33. Next, 248 determining whether the obstacle 33 is detected during the opening sequence. Responsive to determining that an obstacle 33 is detected during the opening sequence, the method continues with the step of 250 stopping movement of the closure member 26, 30 and emitting an audible indicator. Responsive to determining that no obstacle is detected during the opening sequence, the method also includes the step of 252 completing the movement of the closure member 26, 30.

Alternatively, the scanning actuator can be configured to simultaneously rotate the handle 49, 57 and the radar unit 52, 54 about the horizontal rotation axis 120 in a handle opening path. Specifically, the handle 49, 57 and the radar unit 52, 54 are rotated about the horizontal rotation axis 120 between a horizontal rotation handle closed position wherein the handle 49, 57 is angled relative to the closure member 26, 30 at a first horizontal handle rotation angle and a horizontal rotation handle open position wherein the handle 49, 57 is angled relative to the closure member 26, 30 at a second horizontal handle rotation angle greater than the first horizontal handle rotation angle.

Consequently, as best shown in FIG. 20, a method of detecting an obstacle 33 and operating a closure member 26, 30 of a motor vehicle 22 equipped with at least one radar unit 52, 54 and a scanning actuator configured to simultaneously rotate the handle 49, 57 and the radar unit 52, 54 about the horizontal rotation axis 120 is provided. The method includes the step of 254 scanning for a power opening signal. The method continues with the step of 256 determining whether the power opening signal has been received. Next, responsive to determining that the power opening signal has not been received, 258 waiting for the power opening signal and returning to the step of scanning for the power opening signal. Responsive to determining that the power opening signal has been received, the method continues by 260 initiating a scan by transmitting the emitted radar signals in the space adjacent the closure member 26, 30 of the motor vehicle 22 and receiving the emitted radar signals reflected from the obstacle 33 using the radar unit 52, 54 with the handle 49, 57 being in the horizontal rotation handle closed position and the radar in a first horizontal handle rotation angle (e.g., 10 degrees). The next step of the method is 262 transmitting the emitted radar signals in the space adjacent the closure member 26, 30 of the motor vehicle 22 and receiving the emitted radar signals reflected from the obstacle 33 using the radar unit 52, 54 while rotating the handle 49, 57 to the horizontal rotation handle open position (e.g., 50 degrees) and adjusting a noise floor as necessary. The method proceeds with the step of 264 determining whether the obstacle 33 is in the handle opening path. Then, responsive to determining that no obstacle is in the handle opening path, the method includes the step of 266 releasing a latch of the closure member 26, 30 and initiating movement of the closure member 26, 30 in an opening sequence using the at least one power actuator 60, 62 while transmitting the emitted radar signals and receiving the emitted radar signals reflected from the obstacle 33. The method continues with the steps of 268 determining whether the obstacle 33 is in a closure member opening path and, responsive to determining that an obstacle 33 is in the closure member opening path, 270 preventing opening of the closure member 26, 30 and emitting an audible indicator. Responsive to determining that an obstacle is not in the closure member opening path, the method then includes the step of 272 continuing movement of the closure member 26, 30 in the opening sequence using the at least one power actuator 60, 62 while transmitting the emitted radar signals and receiving the emitted radar signals reflected from the obstacle 33. Next, 274 determining whether the obstacle 33 is detected during the opening sequence and, responsive to determining that an obstacle 33 is detected during the opening sequence, 276 stopping movement of the closure member 26, 30 and emitting an audible indicator. Responsive to determining that no obstacle is detected during the opening sequence, the method also includes the step of 278 completing the movement of the closure member 26, 30.

Figure 21:
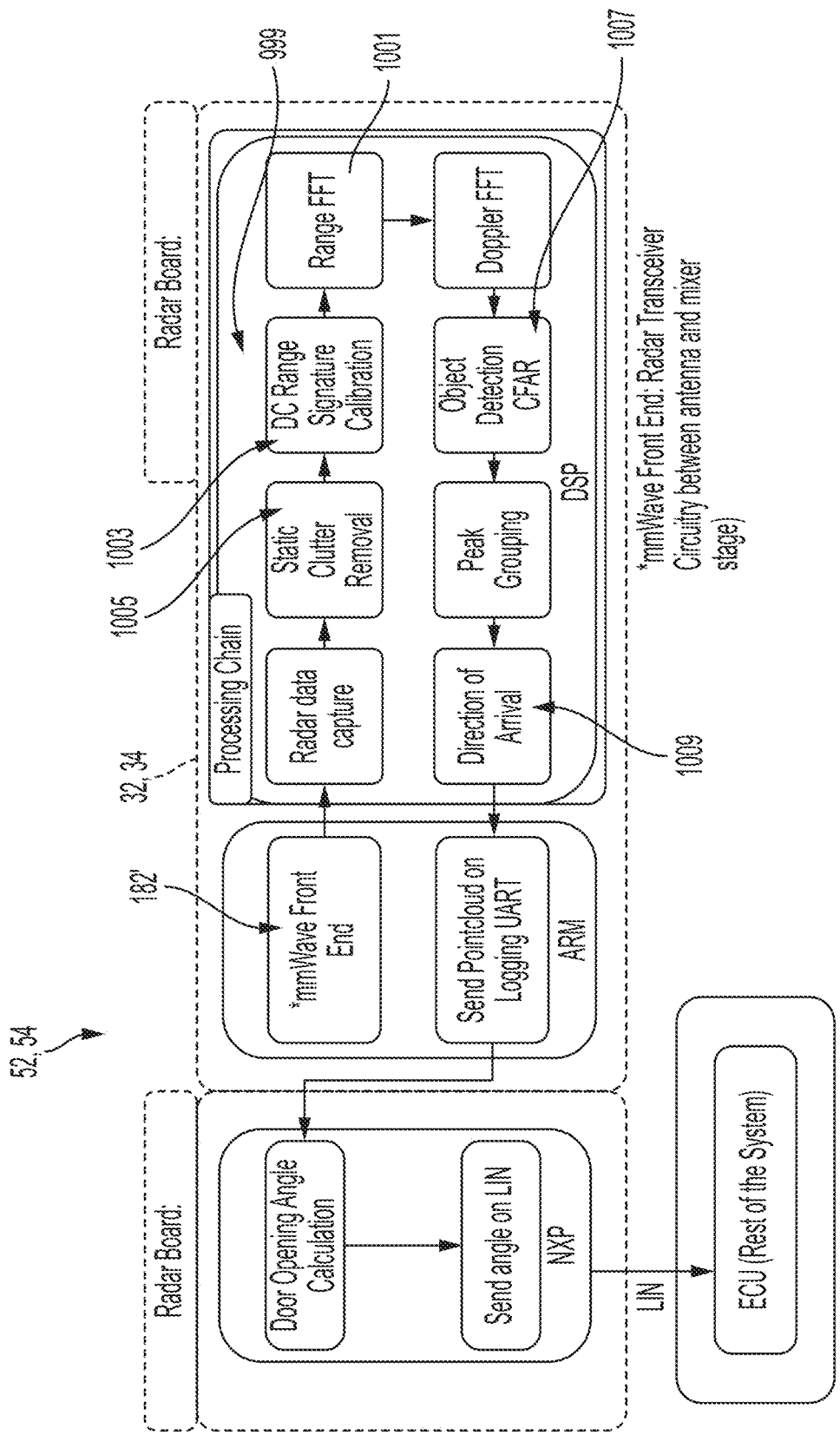
FIG. 21 is a block diagram of a radar sensor and a controller in communication with the radar sensor show configured for performing a method for detecting an obstacle using the radar sensor according to aspects of the disclosure.

Now referring to FIG. 21, there is shown a method 999 of detecting an object executed by the electronic control unit 32 and/or electronic control unit 34 in accordance with an illustrative example shown as a series of steps of a signal processing chain.

Figure 22:
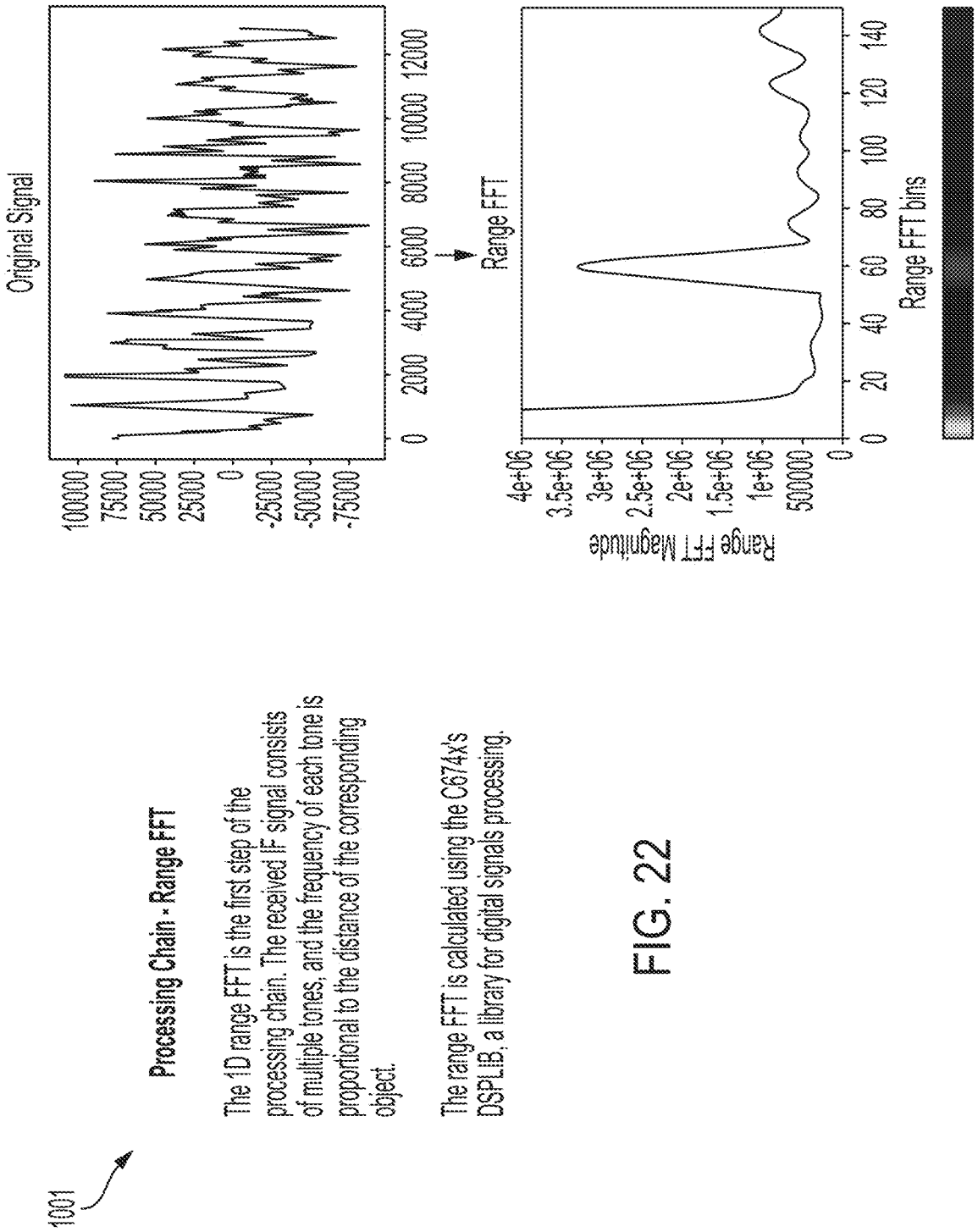
Figure 23:
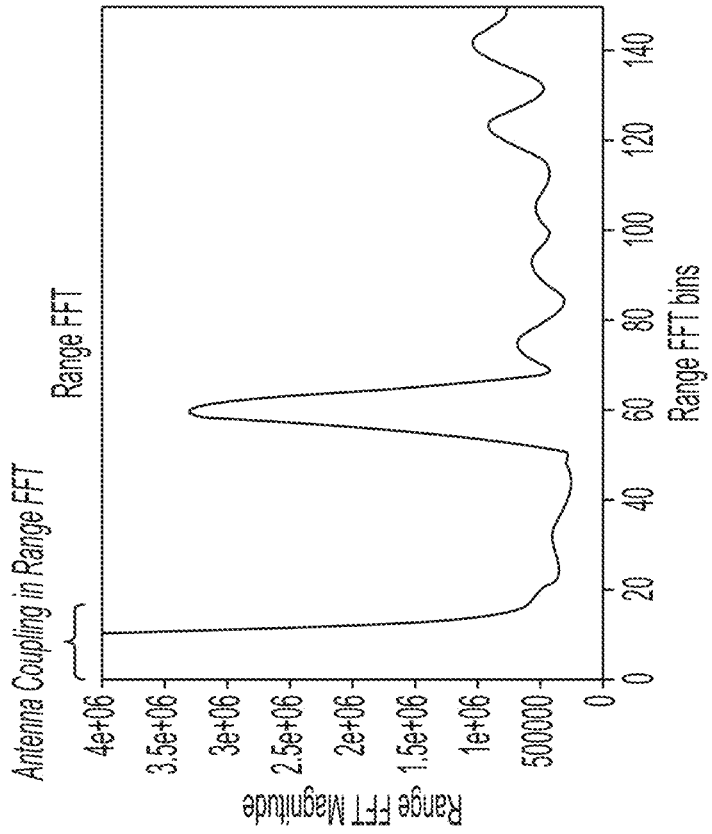
Figure 24:
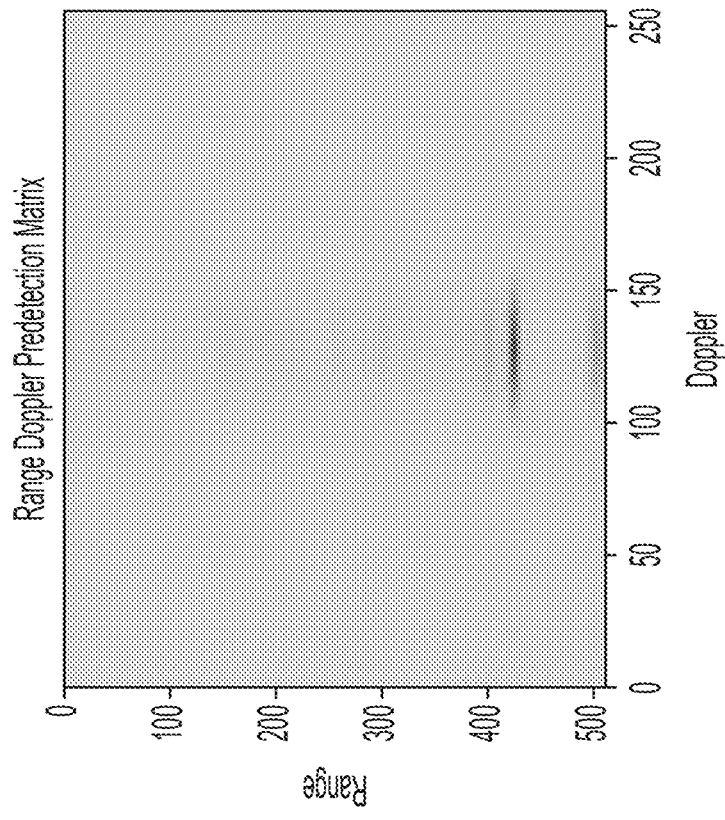

FIGS. 22 to 26 show processing steps of the method 999 in more details. As shown in FIG. 24, after or while the radar unit captures radar data (by transmitting emitted radar signals and receiving reflected radar signals reflected by an object), a static clutter removal algorithm is applied to the captured data during the static clutter removal step 1005. The static clutter removal algorithm is implemented by subtracting from the samples the mean value of the input samples to the two dimensional Fast Fourier Transformation (FFT). This has the effect of removing all stationary objects in the radar's field of view, only keeping dynamic moving objects. As the car door or liftgate swings, obstacles appear dynamic from the perspective of the radar while static sources of noise are removed.

Then, as shown in FIG. 23, DC range signature calibration is performed in step 1003 to remove noise from within a close range of the radar unit. Antenna coupling signature dominates the range bins close to the radar. These are the bins in the range FFT output located around DC. When this feature is enables, the signature is estimated during the first N chirps, and then it is subtracted during the subsequent chirps. During the estimation period, the specified bins (defined as [negative BinIdx, positive BinIdx]) around DC are accumulated and averaged. It is assumed that no objects are present in the vicinity of the radar at that time.

As shown in FIG. 22, the Range FFT calculation step 1001 is performed next. The one dimension range FFT is the first step of the processing chain. The received IF signal consists of multiple tones, and the frequency of each tone is proportional to the distance of the corresponding object.

Then Doppler FFT calculation is performed and, as shown in FIG. 25, an object detection constant false alarm rate (CFAR) adaptive algorithm is used to separate signals from noise in step 1007. The points at which the magnitude of the range profile cross the calculated CFAR threshold represent range detections. Different CFAR methods calculate Z differently. For example, in CFAR Ordered Statistics (CFAR-OS), Z is calculated as the Kth ordered element of the two neighborhoods.

Peak groupings are identified and, as shown in FIG. 26, the direction of their arrival is determined in step 1009. Estimating the angle of an object requires at least two Rx antennas. The signal from the Tx antenna is reflected from an object (at an angle θ with regard to the radar) and is received at both Rx antennas. The signal from the object must travel an additional distance of d sin θ to reach the second $Rx_2$ antenna. This corresponds to a phase difference between the signals received at the two Rx antennas of:

$$\omega = 2\pi/\lambda d \sin \theta$$

By performing an FFT across an array generated from the antenna placement, peaks in the resultant FFT correspond to signals from those directions. In addition, if multiple peaks are detected, multiple objects can be detected (per range gate).

Figure 27:
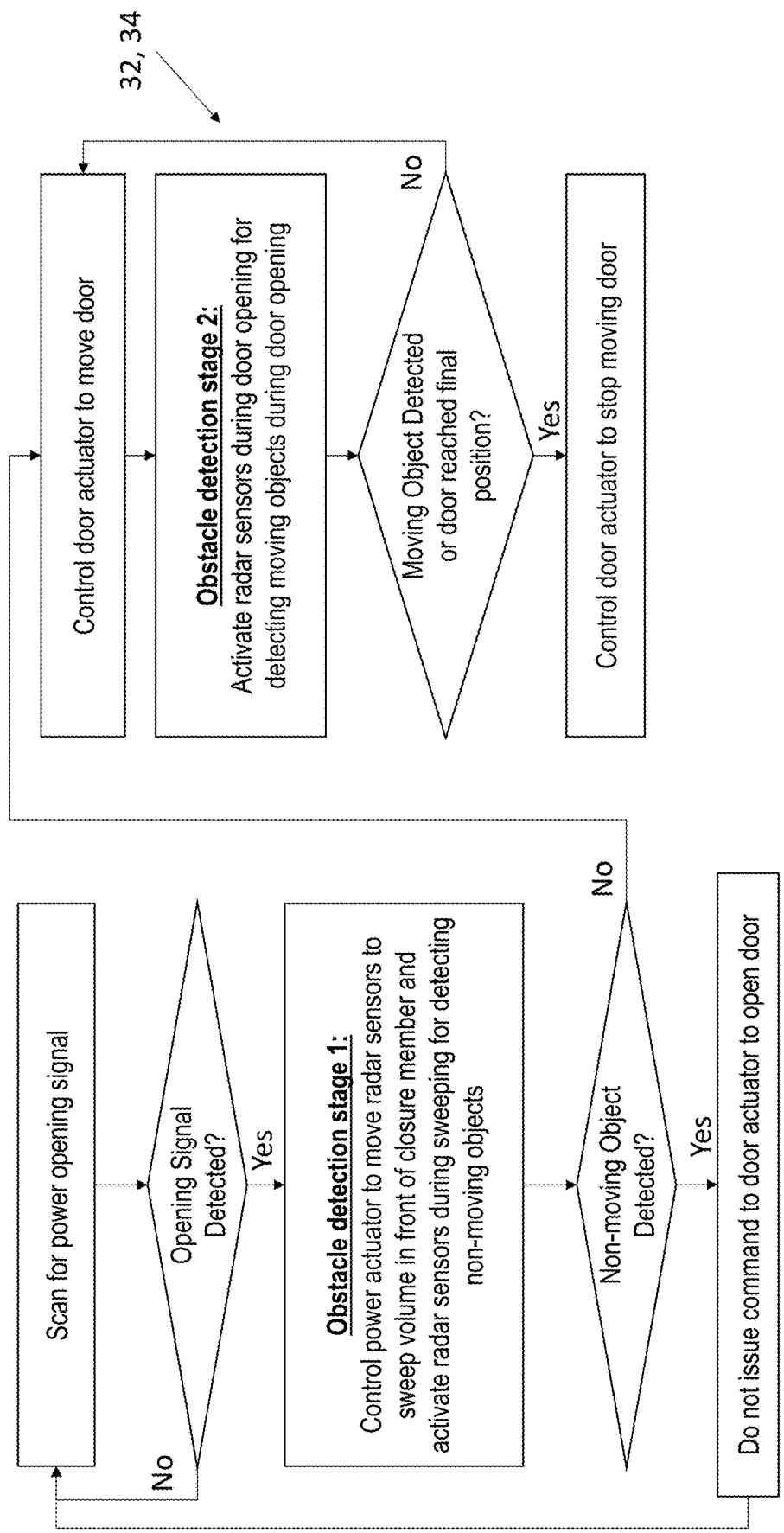
FIG. 27 is a flowchart of an example method of programming a controller for controlling movement of a door using the moveable radar sensors described herein, in accordance with illustrative examples.

Now referring to FIG. 27, there is shown a method, executed by the controller 32, 34, of controlling opening of a vehicle door using two stages of operation of the radar sensor, in accordance with an illustrative example. First, the controller scans for a power opening signal or door open command, such as from a keyfob or user actuatable control (such as a human machine interface (HMI)) within the vehicle. Once an opening signal is detected, obstacle detection stage one commences. The controller controls the power actuator to move the radar sensors in a sweeping motion across the field of view of the radar sensors in an area adjacent and exterior to the door or closure member. The radar sensors are active during the sweeping for detecting non-moving objects. If a non-moving object is detected, the controller does not issue a command to the door actuator to open the door and the controller again scans for a power opening signal. If no non-moving object is detected, the controller controls the door actuator to move the door. Then, obstacle detection state two commences. The controller activates the radar sensors during the opening of the door to detect moving objects in the opening path of the door during the door opening. If no moving object is detected during the door opening and the door has not reached its final position, the controller continues to control the door actuator to move the door. If a moving object is detected or the door reaches its final position, the controller controls the door actuator to stop moving the door.

Figure 28:
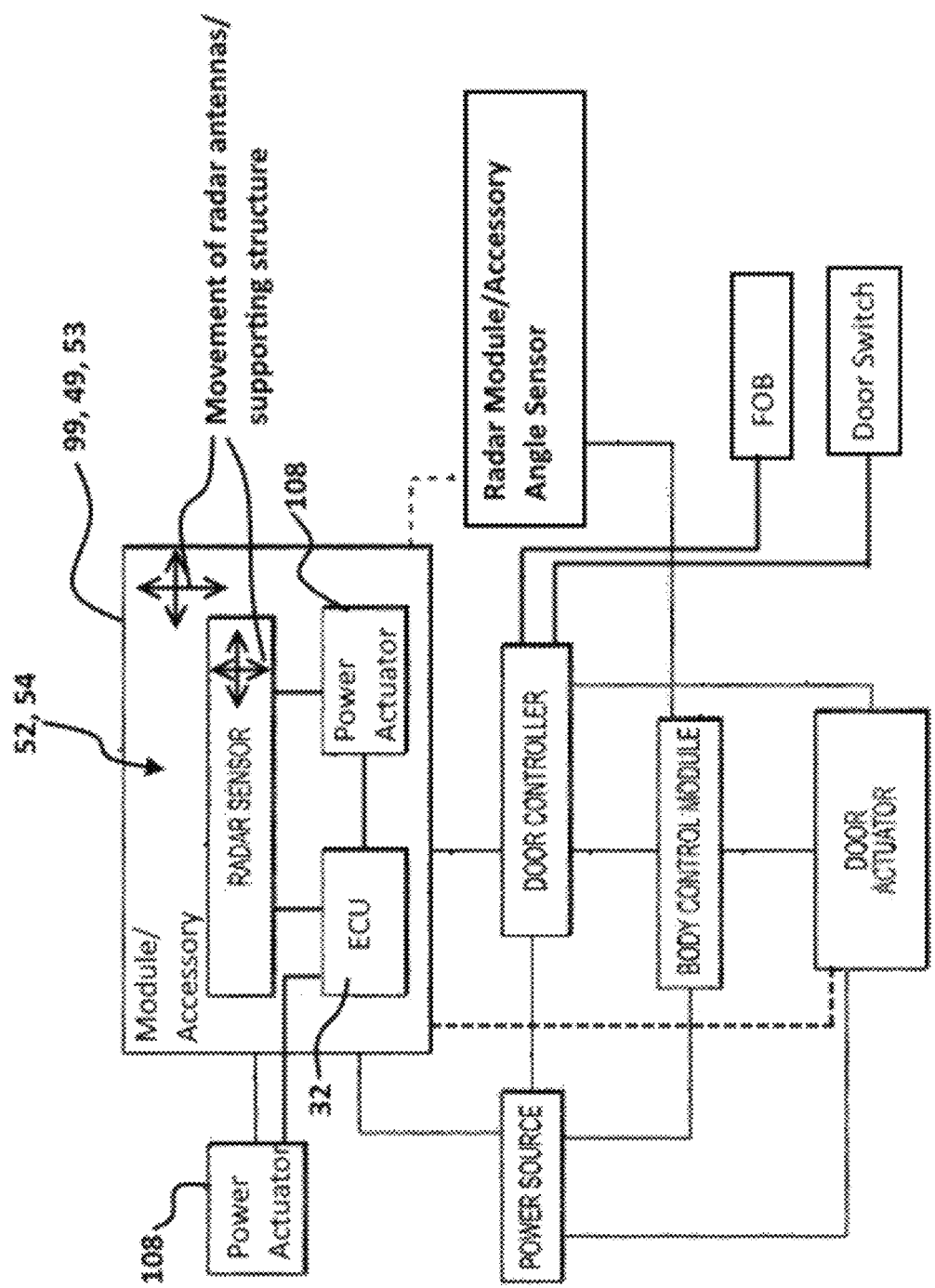
FIG. 28 is a block diagram of a radar based non-contact obstacle detection system in accordance with the teachings described herein.

FIG. 28 is a block diagram illustrating the interconnections of various system components for controlling the movement of a vehicle door using the teachings described herein, in accordance with an illustrative example.

Figure 29:
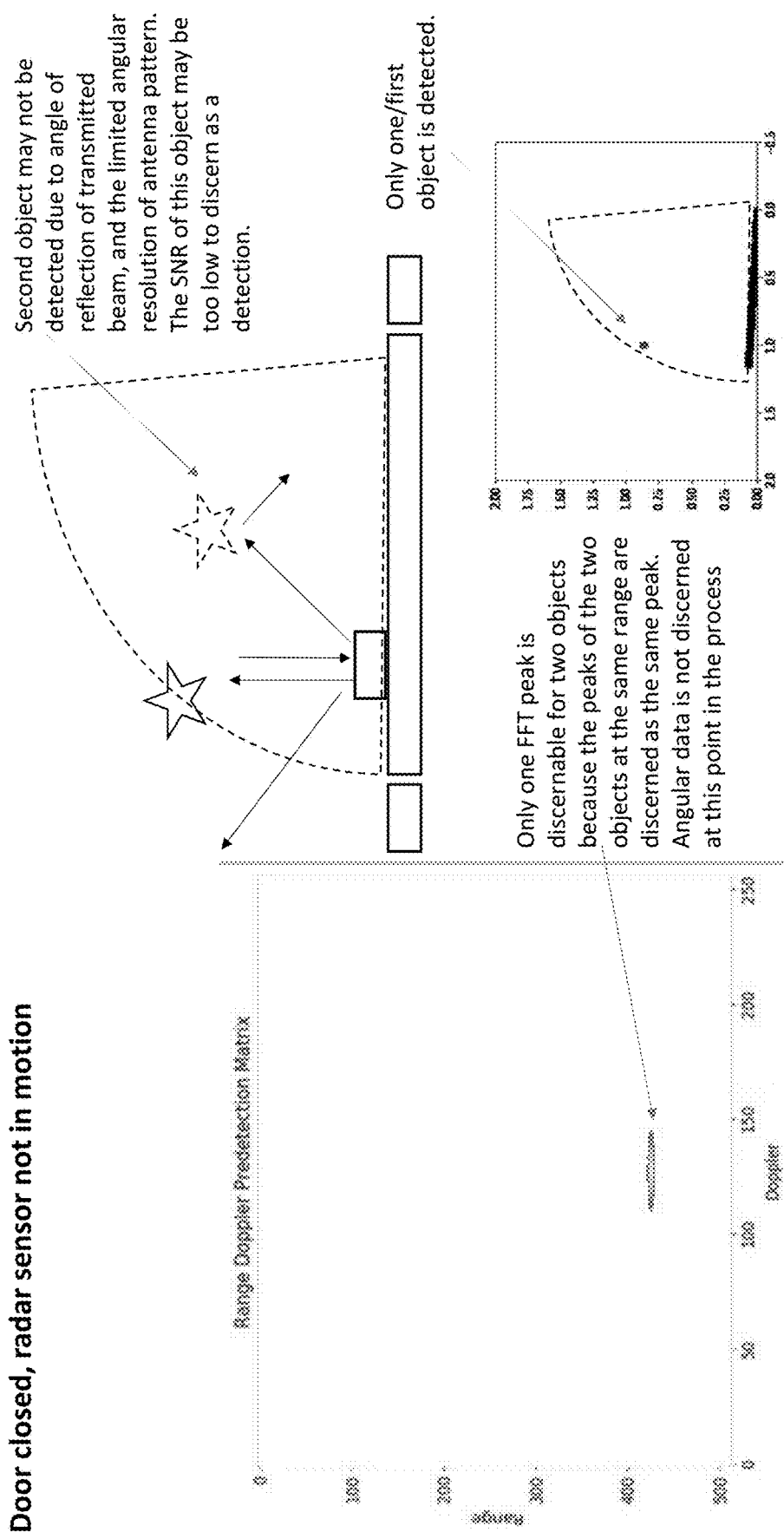

FIGS. 29 to 32 illustrate exemplary operation of the systems described herein showing a corresponding door position map, obstacle position adjacent the door, and corresponding mapped and FFT radar points. As shown in FIGS. 29 and 30, the system increases the detectability (reflectivity detection) of objects within the radar sensor's field of view when the door to which the sensor is disposed is closed and the radar sensor is in motion (FIG. 30) compared to when the radar sensor is not in motion (FIG. 29). When the sensor is not in motion, a second object may not be detected due to the angel of reflection of the transmitted beam and the limited angular resolution of the antenna pattern. The SNR of this second object may be too low to cause a detection. The range Doppler prediction matrix of FIG. 29 shows only one FFT peak despite the presence of two objects because the peaks of the two objects at the same range are detected as the same peak. This is because angular data is not determined at this point in the process. When the sensor is in motion, the movement of the radar sensor changes the field of view of the sensors and the second object is detected by sweeping the field of view of the sensor in front of the door. As shown in the range Doppler prediction matrix of FIG. 30, appearance of an FFT peak at a different range occurs indicative of another object in the field of view of the radar sensor. In other words, the single peak separates into two distinct peaks as range and velocity relative to the radar sensors change during the movement of the sensors. Thus, the radar system detects only one of the two objects in FIGS. 29 and 30 when the radar is not moving, but detects both objects when the radar is in motion.

Figure 32:
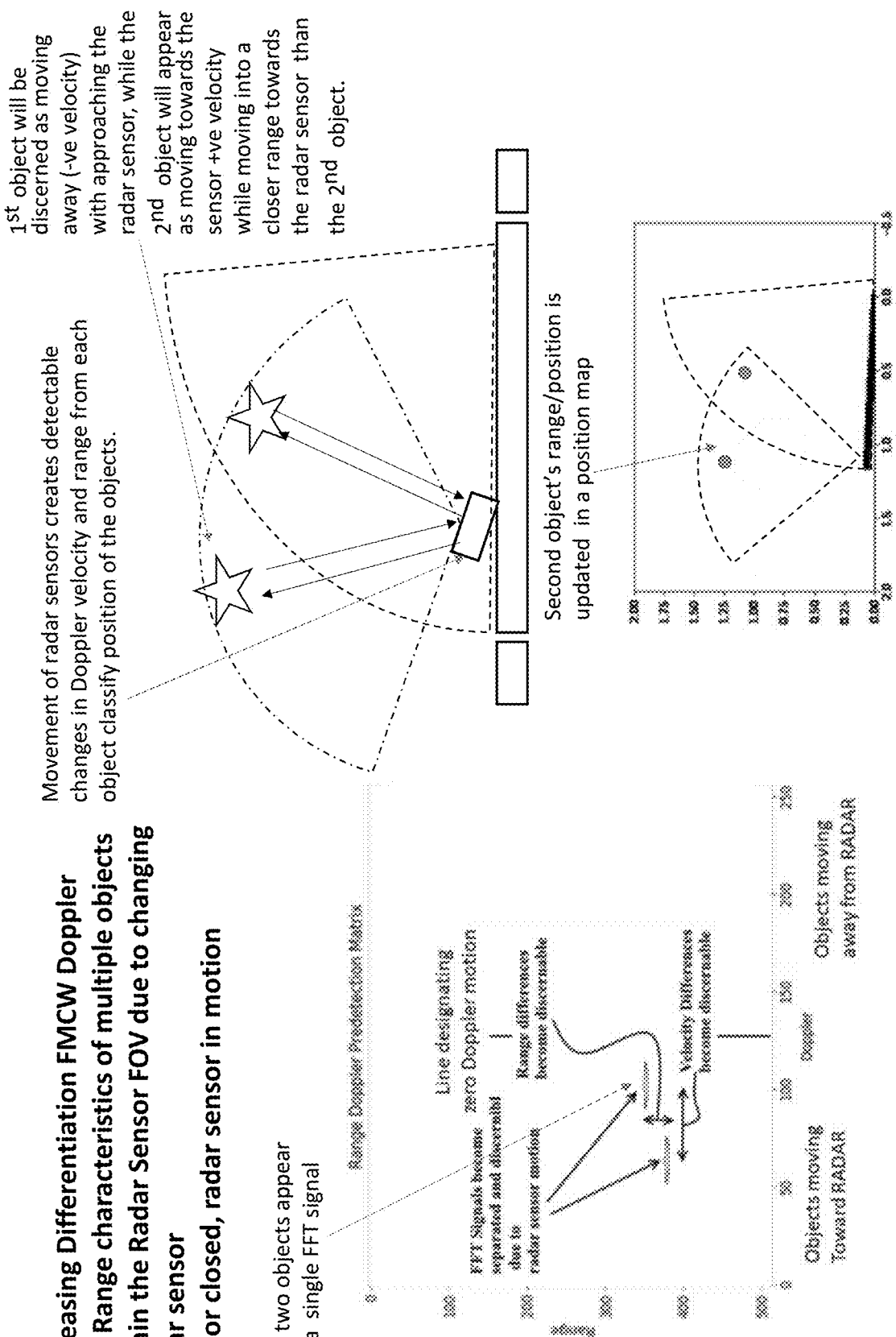

As shown in FIGS. 31 and 32, the system increases differentiation of multiple objects within the radar sensor's field of view when the door to which the radar sensor is attached is closed and the radar sensor is in motion (FIG. 32) compared to when the radar sensor is not in motion (FIG. 31). The range Doppler prediction matrix of FIG. 31 shows two objects at the same distance from the radar sensor as a single FFT signal when the sensor is not in motion. The two objects cannot be discerned from one another nor can it be determined what angular position the objects are relative to the radar sensor. Thus, it may be unknown whether the detected object lies within the door opening path or outside the door opening path. This can lead to false positive detections of objects that actually reside outside the path or false negative detections of objects that actually are within the path of the door. When the radar is in motion, the range Doppler prediction matrix differentiates the FFT signals as two objects at different angles relative to the radar will appear as moving more or less toward or away from the radar. For example, an object to the left of the radar sensor may be seen by the sensor as moving away (with a negative velocity) from the sensor when the sensor sweeps its field of view while an object to the right of the sensor may be seen as moving towards the sensor with a positive velocity. Thus, by moving the radar sensor, the system determines the range and position of one or more objects relative to the door.

Figure 33:
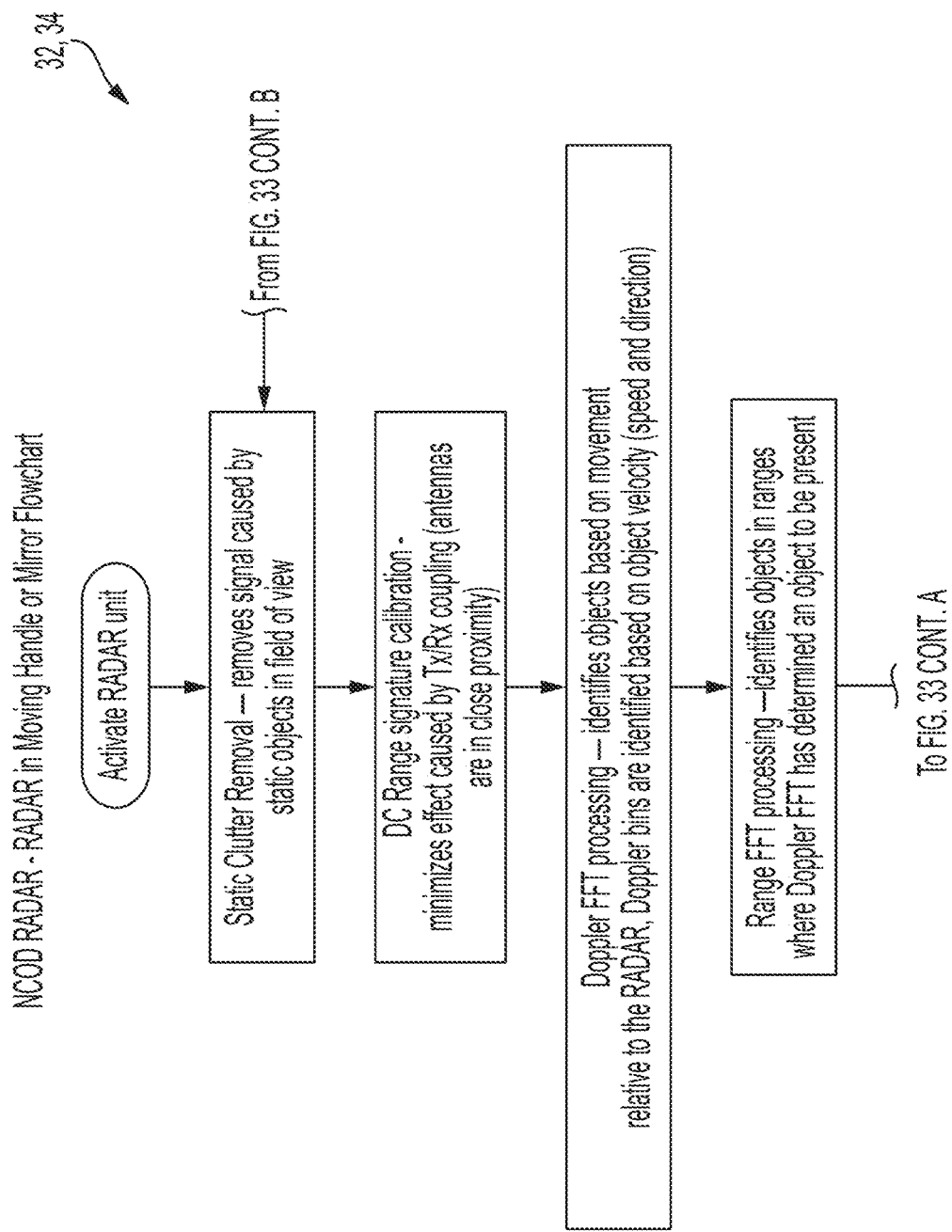
FIG. 33 is a flowchart of an example method of programming a controller for controlling movement of a door using the moveable radar sensors including radar data processing steps of radar data captured by the moveable radar sensors, in accordance with illustrative examples.

Now referring to FIG. 33, there is shown a method executed by the controller 32, 34 for controlling a door in response to processing radar signals for discerning or differentiating obstacles within the space adjacent the door, in accordance with an illustrative example. The controller activates the radar unit and begins transmitting emitted radar signals and receiving reflected radar signals reflected from an object within the field of view of a the radar sensor. The controller performs static clutter removal and removes signal caused by static objects in the field of view. The controller performs DC range signature calibration to minimize the effect caused by Tx/Rx coupling when the antennas are in close proximity. The controller performs Doppler FFT processing and identifies objects based on movement relative to the radar sensor. Doppler bins are identified based on object velocity relative to the radar sensor. The controller performs range FFT processing and identifies objects in ranges where the Doppler FFT has determined an object to be present. The controller groups peaks to merge closely located peaks so that the angle of arrival calculation is more efficient and reduces the noise level for single detections. The controller performs Doppler disambiguation to differentiate objects during movement. The distances to the detected objects are calculated by populating a matrix with the range and Doppler data and summing the matrix. Doppler and CFAR algorithms are run to determine the locations of the objects in a two dimensional space. An angle of arrival calculation is run at the ranges where the CFAR algorithms have determined an object to be located in four dimensions. This results in range, azimuth, elevation and speed being determined. More than one object can be detected as long as they are in separate range bins or in the same range bin but different Doppler bins. An advantage provided by moving the radar sensor is that as the radar sensor moves, two objects that appear in the same range bin may appear as separate directions in the same range based on the Doppler differences. Thus a moving system will result in determined ranges to objects shifting relative to the origin point of the moving field of view of the radar with relative velocity differences to the radar.

Once the objects have been detected and located, the controller calculates the door opening angle and determines if the door movement has been initiated. If the door movement has not been initiated, the controller controls the scanning actuator to begin movement of the radar (such as by rotating the handle at which the radar sensor is disposed) to enable radar Doppler detections. The controller operates the scanning actuator to fully move the radar sensor across its range of motion (such as by rotating the handle fully open and fully closed) to completely scan the radar field of view. Then the controller determines if the door can begin opening without contacting the object. If the door movement has already been initiated, the controller determines if the door can continue opening without contacting the object. If the door can open without contacting the object, the controller continues the door open sequence, continues radar scanning, and performs the radar calculation steps until the door is fully opened or an object is detected. If the door cannot continue opening without contacting an object, the controller stops or does not open the door and emits an audible indicator. Then the sequence is ended.

The dynamic radar scanning provided by the system 20 disclosed herein advantageously provides improved object detection as compared to static radar scanning. Specifically, relative movement has been found to improve the detection of low radar cross-section (RCS) objects due to the fact that a stationary or static obstacle 33 can be tracked by the moving radar unit 52, 54, while any random noise shown during a static scan can be filtered out during the dynamic scan.

Clearly, changes may be made to what is described and illustrated herein without, however, departing from the scope defined in the accompanying claims. The non-contact obstacle detection system 20 may operate with myriad combinations of various types of non-contact sensors and for any closure members of the motor vehicle 22. For example the radar system may be disposed at or near any door of the vehicle, a lift gate, a trunk lid, a hood, a truck bed cover, or any other member of the vehicle that may be power operated to open and close and may be at risk of contacting an object adjacent and exterior the member. In general, the detection system 20 may be used also for other purposes, within the motor vehicle 22, or for different automotive applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the non-contact obstacle detection system 20 can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

The invention claimed is:

1. A vehicular door opening control system, the vehicular door opening control system comprising:
    a radar unit disposed at a vehicle equipped with the vehicular door opening control system, wherein the radar unit has a field of sensing adjacent to and exterior of a door of the vehicle, and wherein the radar unit transmits emitted radar signals and receives reflected radar signals reflected from an object present in the field of sensing;
    a scanning actuator coupled to the radar unit and operable to move the radar unit relative to the door to create a variation between the transmitted radar signals and the reflected radar signals indicative of a shift between the radar unit and the object;
    an electrically powered actuator coupled to the door and operable to, when electrically powered, move the door relative to the vehicle to open the door;
    an electronic control unit (ECU) in communication with the radar unit, the scanning actuator and the electrically powered actuator, wherein the ECU is operable to operate the radar unit to transmit the emitted radar signals and receive the reflected radar signals;
    wherein, while the radar unit is transmitting the emitted radar signals and receiving the reflected radar signals, the ECU operates the scanning actuator to move the radar unit relative to the door;
    wherein the radar unit is disposed in a handle of the door, and wherein the handle comprises a first handle end and a second handle end, and wherein the handle is movable relative to the door along a handle moving path, and wherein the radar unit moves relative to the door according to movement of the handle along the handle moving path;
    wherein the scanning actuator moves the radar unit relative to the door by moving the handle along the handle moving path between a first handle position, where the first and second handle ends are adjacent the door, and a second handle position, where at least one of the first and second handle ends is spaced from the door;
    wherein the ECU processes the received reflected radar signals to determine presence of the object adjacent to and exterior of the door; and
    wherein, responsive to determining presence of the object adjacent to and exterior of the door, the ECU operates the electrically powered actuator to control movement of the door relative to the vehicle.

2. The vehicular door opening control system of claim 1, wherein, when the handle is in the first handle position, the ECU determines presence of the object adjacent to and exterior of the door by determining presence of the object in the handle moving path.

3. The vehicular door opening control system of claim 1, wherein a vertical rotation axis is adjacent the first handle end and the handle is moved along the handle moving path by rotating the handle and the radar unit about the vertical rotation axis in a vertical handle opening path between the first handle position and the second handle position.

4. A vehicular door opening control system, the vehicular door opening control system comprising:
    a radar unit disposed at a vehicle equipped with the vehicular door opening control system, wherein the radar unit has a field of sensing adjacent to and exterior of a door of the vehicle, and wherein the radar unit transmits emitted radar signals and receives reflected radar signals reflected from an object present in the field of sensing;
    a scanning actuator coupled to the radar unit and operable to move the radar unit relative to the door to create a variation between the transmitted radar signals and the reflected radar signals indicative of a shift between the radar unit and the object;
    an electrically powered actuator coupled to the door and operable to, when electrically powered, move the door relative to the vehicle to open the door;
    an electronic control unit (ECU) in communication with the radar unit, the scanning actuator and the electrically powered actuator, wherein the ECU is operable to operate the radar unit to transmit the emitted radar signals and receive the reflected radar signals;
    wherein, while the radar unit is transmitting the emitted radar signals and receiving the reflected radar signals, the ECU operates the scanning actuator to move the radar unit relative to the door;
    wherein the ECU processes the received reflected radar signals to determine presence of the object adjacent to and exterior of the door;
    wherein, responsive to determining presence of the object adjacent to and exterior of the door, the ECU operates the electrically powered actuator to control movement of the door relative to the vehicle;
    wherein the radar unit is disposed in a handle of the door comprising a first handle end and a second handle end and being movable along a handle moving path; and
    wherein a horizontal rotation axis extends along a surface of the vehicle and the handle is moved along the handle moving path by the scanning actuator rotating the handle and the radar unit about the horizontal rotation axis in a horizontal handle opening path between a handle closed position wherein the handle is angled relative to the door at a first horizontal handle rotation angle and a handle open position wherein the handle is angled relative to the door at a second horizontal handle rotation angle greater than the first horizontal handle rotation angle.

5. The vehicular door opening control system of claim 1, wherein the variation comprises a frequency variation between the emitted radar signals and the reflected radar signals indicative of a relative velocity shift between the radar unit and the object.

6. The vehicular door opening control system of claim 1, wherein the variation comprises a reflectivity intensity variation between the emitted radar signals and the reflected radar signals indicative of a relative angle shift between the radar unit and the object.

7. The vehicular door opening control system of claim 1, wherein the radar unit is configured as a frequency modulated continuous wave radar unit.

8. The vehicular door opening control system of claim 1, wherein the radar unit is configured as a continuous wave radar unit.

9. A method of controlling opening of a vehicular door, the method comprising:
providing a radar unit at or near a door of a vehicle and having a field of sensing that includes a space adjacent to and exterior of the door;
providing a scanning actuator coupled to the vehicle and the radar unit and operable to operably move the radar unit relative to the door;
providing an electrically powered actuator at the vehicle and operable to, when electrically powered, move the door along a door path;
transmitting emitted radar signals from the radar unit in the space adjacent to and exterior of the door and receiving at the radar unit reflected radar signals reflected from the object;
while transmitting emitted radar signals and receiving reflected radar signals, operating the scanning actuator to move the radar unit relative to the door to create a variation between the emitted radar signals and the reflected radar signals indicative of a relative shift between the radar unit and the object;
wherein the radar unit is disposed in a handle of the door, and wherein the handle comprises a first handle end and a second handle end, and wherein the handle is movable relative to the door along a handle moving path, and wherein the radar unit moves relative to the door according to movement of the handle along the handle moving path;
wherein operating the scanning actuator to move the radar unit relative to the door comprises moving the handle along the handle moving path between a first handle position, where the first and second handle ends are adjacent the door, and a second handle position, where at least one of the first and second handle ends is spaced from the door;
responsive to receiving reflected radar signals, processing the reflected radar signals at an electronic control unit (ECU) to determine presence of the object in the space adjacent to and exterior of the door;
responsive to determining via the ECU presence of the object in the space adjacent to and exterior of the door, determining whether the object is in the door path;
responsive to determining the object is not in the door path, operating the electrically powered actuator to move the door along the door path; and
responsive to determining the object is in the door path, preventing movement of the door.

10. The method of claim 9, wherein operating the scanning actuator to move the radar unit relative to the door comprises rotating the handle about a vertical rotation axis at the first handle end and in the handle moving path between the first handle position, where the second handle end is adjacent to the door, and the second handle position, where the second handle end is spaced from the door.

11. The method of claim 10, wherein determining presence of the object in the space adjacent to and exterior of the door further comprises determining whether the object is in the handle moving path, and wherein the method further comprises, responsive to determining the object is in the handle moving path, preventing movement of the radar unit relative to the door and preventing movement of the door.

12. A method of controlling opening of a vehicular door, the method comprising:
providing a radar unit at or near a door of a vehicle and having a field of sensing that includes a space adjacent to and exterior of the door;
providing a scanning actuator coupled to the vehicle and the radar unit and operable to operably move the radar unit relative to the door;
providing an electrically powered actuator at the vehicle and operable to, when electrically powered, move the door along a door path;
transmitting emitted radar signals from the radar unit in the space adjacent to and exterior of the door and receiving at the radar unit reflected radar signals reflected from the object;
while transmitting emitted radar signals and receiving reflected radar signals, operating the scanning actuator to move the radar unit relative to the door to create a variation between the emitted radar signals and the reflected radar signals indicative of a relative shift between the radar unit and the object;
responsive to receiving reflected radar signals, processing the reflected radar signals at an electronic control unit (ECU) to determine presence of the object in the space adjacent to and exterior of the door;
responsive to determining via the ECU presence of the object in the space adjacent to and exterior of the door, determining whether the object is in the door path;
responsive to determining the object is not in the door path, operating the electrically powered actuator to move the door along the door path;
responsive to determining the object is in the door path, preventing movement of the door;
wherein the radar unit is disposed in a handle of the door comprising a first handle end and a second handle end; and
wherein operating the scanning actuator to move the radar unit relative to the door comprises rotating the handle about a horizontal rotation axis in a handle opening path between a handle closed position, where the handle is angled relative to the door at a first handle rotation angle, and a handle open position, where the handle is angled relative to the door at a second handle rotation angle greater than the first handle rotation angle.

13. The method of claim 12, wherein determining presence of the object in the space adjacent to and exterior of the door further comprises determining whether the object is in the handle opening path, and wherein the method further comprises, responsive to determining the object is in the handle opening path, preventing movement of the radar unit relative to the door and preventing movement of the door.

14. The method of claim 9, wherein preventing movement of the door comprises operating the electrically powered actuator to move the door to a position along the door path a spaced distance from the object.

15. The method of claim 9, wherein the variation comprises a frequency variation between the emitted radar signals and the reflected radar signals indicative of a relative velocity shift between the radar unit and the object.

16. The method of claim 9, wherein the variation comprises a reflectivity intensity variation between the emitted radar signals and the reflected radar signals indicative of a relative angle shift between the radar unit and the object.

17. The method of claim 9, wherein the radar unit is configured as a frequency modulated continuous wave radar unit.

18. The method of claim 9, wherein the radar unit is configured as a continuous wave radar unit.

19. The method of claim 9, wherein transmitting emitted radar signals from the radar unit is responsive to the ECU receiving a door open command.

20. A method of controlling opening of a vehicular door, the method comprising:
providing a radar unit disposed at a handle of a door of a vehicle and having a field of view comprising a space adjacent to and exterior of the door, the handle comprising a first handle end and a second handle end;
providing a scanning actuator coupled at least to the vehicle and the radar unit and operable to operably move the radar unit relative to the door;
providing an electrically powered actuator at the vehicle and operable to, when electrically powered, move the door along a door path;
transmitting emitted radar signals from the radar unit in the space adjacent to and exterior of the door and receiving at the radar unit reflected radar signals reflected from the object;
while transmitting emitted radar signals and receiving reflected radar signals, operating the scanning actuator to move the radar unit relative to the door to create a variation between the emitted radar signals and the reflected radar signals indicative of a relative shift between the radar unit and the object;
wherein the radar unit moves relative to the door according to movement of the handle along a handle moving path;
wherein operating the scanning actuator to move the radar unit relative to the door comprises moving the handle relative to the door along the handle path between a first handle position, where the first and second handle ends are adjacent the door, and a second handle position, where at least one of the first and second handle ends is spaced from the door;
responsive to receiving reflected radar signals, processing the reflected radar signals at an electronic control unit (ECU) to determine presence of the object in the space adjacent to and exterior of the door;
wherein determining presence via the ECU of the object in the space adjacent to and exterior of the door comprises determining whether the object is in the door path;
responsive to determining the object is in the door path, preventing movement of the door along the door path; and
responsive to determining the object is not in the door path, operating the electrically powered actuator to move the door along the door path.

21. The method of claim 20, wherein moving the handle relative to the door along the handle path comprises rotating the handle about a vertical rotation axis at the first handle end and in the handle path between the first handle position, where the second handle end is adjacent to the door and the second handle position, where the second handle end is spaced from the door.

22. A method of controlling opening of a vehicular door, the method comprising:
providing a radar unit disposed at a handle of a door of a vehicle and having a field of view comprising a space adjacent to and exterior of the door, the handle comprising a first handle end and a second handle end;
providing a scanning actuator coupled at least to the vehicle and the radar unit and operable to operably move the radar unit relative to the door;
providing an electrically powered actuator at the vehicle and operable to, when electrically powered, move the door along a door path;
transmitting emitted radar signals from the radar unit in the space adjacent to and exterior of the door and receiving at the radar unit reflected radar signals reflected from the object;
while transmitting emitted radar signals and receiving reflected radar signals, operating the scanning actuator to move the radar unit relative to the door to create a variation between the emitted radar signals and the reflected radar signals indicative of a relative shift between the radar unit and the object;
wherein operating the scanning actuator to move the radar unit relative to the door comprises moving the handle relative to the door along a handle path;
responsive to receiving reflected radar signals, processing the reflected radar signals at an electronic control unit (ECU) to determine presence of the object in the space adjacent to and exterior of the door;
wherein determining presence via the ECU of the object in the space adjacent to and exterior of the door comprises determining whether the object is in the door path;
responsive to determining the object is in the door path, preventing movement of the door along the door path;
responsive to determining the object is not in the door path, operating the electrically powered actuator to move the door along the door path; and
wherein moving the handle relative to the door along the handle path comprises rotating the handle about a horizontal rotation axis in a horizontal handle opening path between a handle closed position, where the handle is angled relative to the door at a first horizontal handle rotation angle, and a handle open position, where the handle is angled relative to the door at a second horizontal handle rotation angle greater than the first horizontal handle rotation angle.

23. The method of claim 20, wherein determining presence of the object in the space adjacent to and exterior of the door further comprises determining whether the object is in the handle path and the method further comprises, responsive to determining the object is in the handle path, preventing movement of the handle relative to the door.

24. The method of claim 20, further comprising, after operating the electrically powered actuator to move the door along the door path and responsive to receiving reflected radar signals, processing the reflected radar signals at the ECU to determine presence of the object in the door path.

25. The method of claim 24, further comprising, after operating the electrically powered actuator to move the door along the door path, if the object is determined to be in the door path, stopping movement of the door at a position along the door path a spaced distance from the object.

26. The method of claim 20, wherein the variation comprises a frequency variation between the emitted radar signals and the reflected radar signals indicative of a relative velocity shift between the radar unit and the object.

27. The method of claim 20, wherein the variation comprises a reflectivity intensity variation between the emitted radar signals and the reflected radar signals indicative of a relative angle shift between the radar unit and the object.

28. The method of claim 20, wherein the radar unit is configured as a frequency modulated continuous wave radar unit.

29. The method of claim 20, wherein the radar unit is configured as a continuous wave radar unit.

* * * * *